United States Patent
Voetter et al.

(10) Patent No.: US 10,829,917 B2
(45) Date of Patent: Nov. 10, 2020

(54) FITTING MOUNT WITH ADAPTER ELEMENT AND VEHICLE WASHROOM AND VEHICLE WITH A FITTING MOUNT

(71) Applicant: Airbus Operations GmbH, Hamburg (DE)

(72) Inventors: Axel Voetter, Hamburg (DE); Tjark Miles, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 61 days.

(21) Appl. No.: 15/985,095

(22) Filed: May 21, 2018

(65) Prior Publication Data

US 2018/0340317 A1     Nov. 29, 2018

(30) Foreign Application Priority Data

May 24, 2017    (DE) .................. 10 2017 208 804

(51) Int. Cl.
| | | |
|---|---|---|
| *E03C 1/042* | (2006.01) |
| *E03C 1/02* | (2006.01) |
| *B60R 15/02* | (2006.01) |
| *B60R 11/00* | (2006.01) |
| *F16M 13/02* | (2006.01) |
| *B61D 35/00* | (2006.01) |
| *B64D 11/02* | (2006.01) |

(52) U.S. Cl.
CPC .............. *E03C 1/042* (2013.01); *B60R 15/02* (2013.01); *E03C 1/021* (2013.01); *B60R 2011/0059* (2013.01); *B60R 2011/0073* (2013.01); *B61D 35/002* (2013.01); *B64D 11/02* (2013.01); *F16M 13/02* (2013.01)

(58) Field of Classification Search
CPC ........................................................ E03C 1/042
USPC ............................................................. 4/695
See application file for complete search history.

(56) References Cited

U.S. PATENT DOCUMENTS

| | | | | |
|---|---|---|---|---|
| 4,728,144 A * | 3/1988 | Crean | ........................ | B60P 3/32 296/156 |
| 9,057,460 B2 * | 6/2015 | Ismert | ........................ | F16L 5/10 |
| 2013/0205494 A1 * | 8/2013 | Whiteside | ............. | E03D 11/143 4/695 |
| 2015/0026946 A1 * | 1/2015 | Ben Jacov | ................ | F16L 5/10 29/428 |

* cited by examiner

*Primary Examiner* — Lauren A Crane
(74) *Attorney, Agent, or Firm* — Greer, Burns & Crain, Ltd.

(57) ABSTRACT

A fitting mount for a vehicle washroom, which comprises an adapter element and a basic mount. The adapter element has a coupling device, at least one opening, which is configured to receive a fitting component, and a circumferential guide surface. The basic mount has a first attachment device for attaching the basic mount, a second attachment device, which is configured to be coupled to the coupling device of the adapter element and to be attached detachably to this, and an internal guide surface, which is configured to at least partially enclose the circumferential guide surface of the adapter element.

18 Claims, 12 Drawing Sheets

A-A

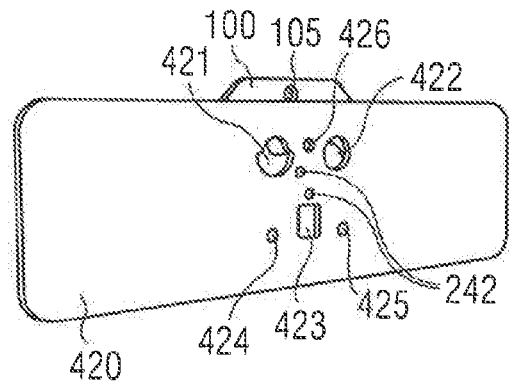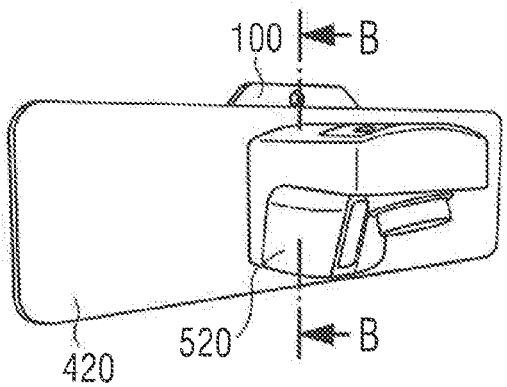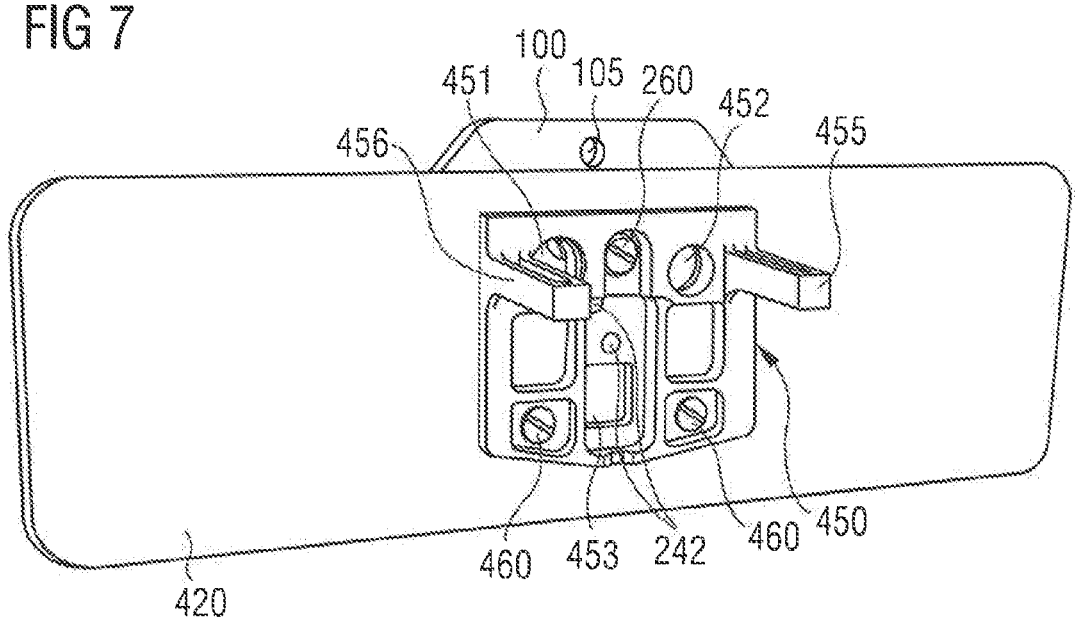

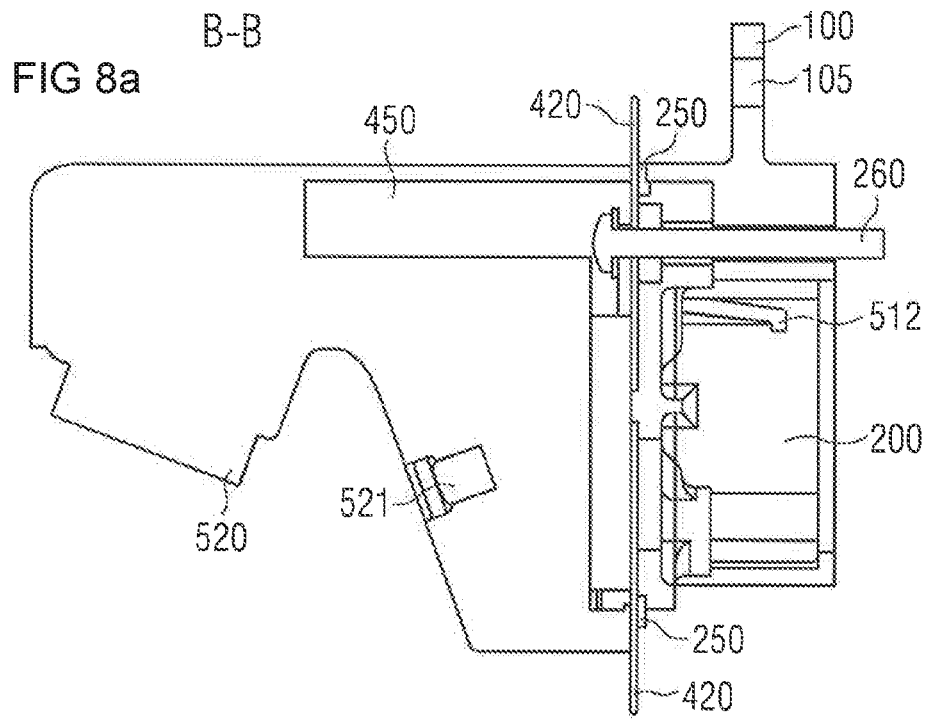
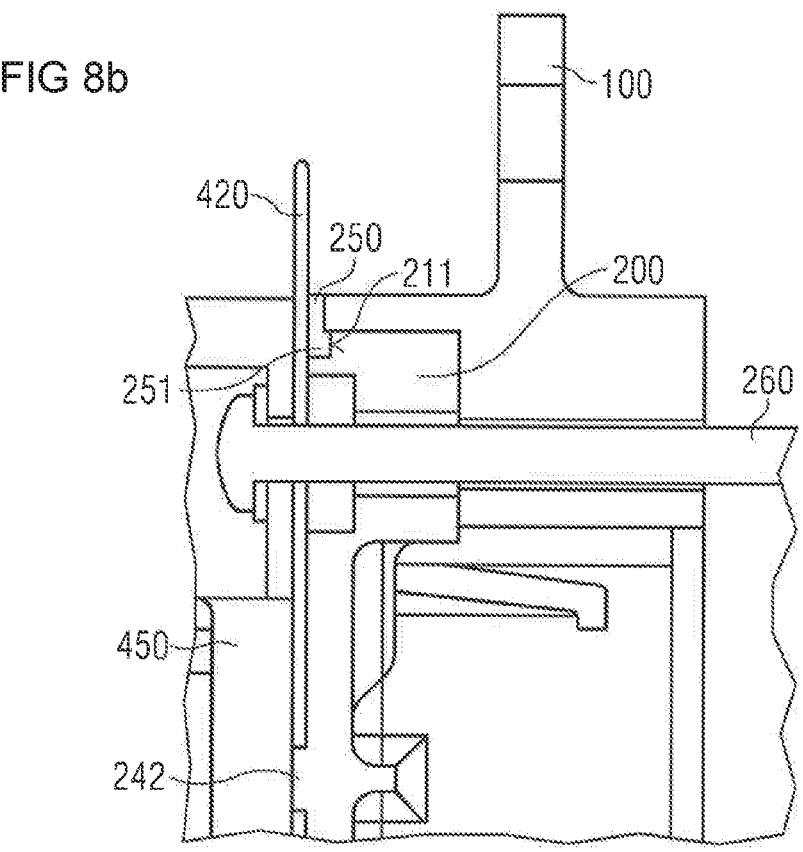

E-E

FITTING MOUNT WITH ADAPTER ELEMENT AND VEHICLE WASHROOM AND VEHICLE WITH A FITTING MOUNT

CROSS-REFERENCES TO RELATED APPLICATIONS

This application claims the benefit of the German patent application No. 10 2017 208 804.4 filed on May 24, 2017, the entire disclosures of which are incorporated herein by way of reference.

BACKGROUND OF THE INVENTION

The invention relates to a fitting mount with an adapter element as well as a vehicle washroom and a vehicle with such a fitting mount. In particular, the invention relates to a fitting mount with an adapter element, which can be coupled to a basic mount and attached detachably to it, as well as a vehicle washroom and a vehicle with such a fitting mount.

Fittings in vehicles, such as aircraft, trains, buses and other mass transport means, and in particular water taps (faucets) or other water-dispensing fittings, are mostly developed for a certain type of vehicle or a vehicle series. This relates not only to the external appearance (design) but also to the type of attachment of the fitting and the line routing of connection lines. Special fittings and attachment means must thus be kept in stock for each vehicle type or vehicle series in order to be able to replace these if necessary.

The requirement therefore exists to provide a fitting mount that facilitates a simple exchange of a fitting.

SUMMARY OF THE INVENTION

According to a first aspect, a fitting mount is provided for a vehicle washroom. The vehicle washroom can be a vehicle toilet, a galley kitchen of the vehicle or another module with water connection inside or outside the vehicle. The fitting mount comprises an adapter element with a coupling device, at least one opening, which is configured to receive a fitting component, and a circumferential guide surface. The at least one opening permits a coupling and/or attachment of a fitting to the adapter element, while the coupling device and the circumferential guide surface serve to attach the fitting mount itself. For example, the at least one opening can be provided on a plate of the adapter element forming a front, while the circumferential guide surface extends substantially perpendicular to the plate on at least one side of the plate in the depth direction. The circumferential guide surface can extend in this case from an outer edging of the plate.

The fitting to be coupled to the adapter element can be, for example, a water tap or another water-dispensing fitting. Alternatively, the at least one opening of the adapter element can be configured for receiving and/or the attachment of another fitting, such as a soap dispenser, hand dryer or similar, for example.

Furthermore, the fitting mount comprises a basic mount with a first attachment device for attaching the basic mount, a second attachment device, which is configured to be coupled to the coupling device of the adapter element and to be attached detachably to this, and an internal guide surface, which is configured to enclose the circumferential guide surface of the adapter element at least partially. The first attachment device can constitute an opening, for example, through which a fastener can be led to attach the basic mount. The basic mount can be attached to a wall or a module in a vehicle washroom by means of the first attachment device. For this a detachable attachment to just a first attachment device can guarantee a rapid exchange of the fitting mount.

The separation of the fitting mount into a basic mount and an adapter element also makes it possible to provide different adapter elements for different fittings, which can all be attached in the same basic mount. For this, the circumferential guide surface, in particular, of all different adapter elements can be executed identically, so that all different adapter elements fit into the internal guide surface of the same basic mount. A simple and quick exchange of a fitting in a vehicle is thus possible. This permits a simple and quick reconfiguration of a vehicle washroom according to the wishes of the vehicle operator.

The internal guide surface of the basic mount and the circumferential guide surface of the adapter element can be designed so that they connect the basic mount and the adapter element in a form-fitting manner. The form-fitting connection also permits the transmission of torques from the adapter element to the basic mount. For example, the circumferential guide surface of the adapter element can extend over the entire depth of the adapter element or at least a greater portion of the depth of the adapter element (for example, more than half of the depth). The internal guide surface of the basic mount can have a depth that corresponds to at least the depth of the circumferential guide surface of the adapter element. Thus, torques can be transmitted via the circumferential guide surface of the adapter element in the depth direction of the adapter element to the internal guide surface of the basic mount. Such torques arise, for example, if a person supports themselves on a fitting coupled to the adapter element or otherwise exerts pressure on the fitting in at least one direction or an object falls on the fitting.

The circumferential guide surface of the adapter element can have openings and/or gaps. These openings and/or gaps (in the circumferential direction of the adapter element) serve to receive elements such as, for example, pipes, sections of the basic mount and/or sections of elements of the vehicle washroom.

Alternatively or in addition, the basic mount can have along one edge of the internal guide surface at least one projection, on which an edge of a component or section of the adapter element forming the circumferential guide surface of the adapter element abuts, in order to create another form fit. Such a projection serves to introduce force from the adapter element into the basic mount, in particular, on account of forces and torques acting on the fitting. Without such an edge, the basic mount offers the advantage, on the other hand, that an adapter element can be inserted from both sides of the basic mount. Thus, the basic mount can likewise be inserted in both directions or built into a module of the vehicle washroom in both directions.

Alternatively or in addition, the cross-sectional shape of the adapter element can have any shape. The internal guide surface of the basic mount defines a delimitation of a space, which corresponds to the cross-sectional shape of the adapter element, so that the circumferential guide surface of the adapter element can be inserted in the internal guide surface of the basic mount and can slide therein in the depth direction of the adapter element. If the cross-sectional shape of the adapter element is not formed circular, is for example elliptical, substantially elliptical with at least one straight surface or rectangular, torsion forces can be transmitted from the adapter element to the basic mount. Alternatively, the adapter element can also have a circular cross-sectional shape, but to transmit torsion forces must then be secured by fasteners against rotating along the internal guide surface of the basic mount. Securing against rotation can also be achieved by means of one or more projections or grooves along the depth direction of the adapter element on the circumferential guide surface and corresponding grooves or projections on the internal guide surface of the basic mount.

Furthermore, the internal guide surface of the basic mount can have at least one opening or be interrupted. The adapter element can have a substantially U-shaped cross-sectional form, for example. This facilitates a line routing of water pipes and/or electric cables through the basic mount to/into the adapter element.

In one embodiment the fitting component can be a water pipe and/or electric cable, which is routed at least partially through the at least one opening of the adapter element. In particular, the fitting component can be an end section or elbow of a water pipe and/or electric cable. This fitting component is then routed through the at least one opening of the adapter element so that one end of the water pipe and/or electric cable protrudes from the adapter element in the direction of the fitting to be applied. The remaining fitting can further be configured to be attached to the protruding line piece of the water pipe and/or electric cable (i.e., to the fitting component). In addition, the fitting can have an end section, which is coupled directly or indirectly to a corresponding section of the adapter element (two-dimensionally). The fitting can thereby be supported on the adapter element, while the actual attachment takes place via the water pipe and/or electric cable.

Alternatively or in addition, the fitting component can be a detachable or integral component of the (visible) fitting. In this case the at least one opening of the adapter element can be configured to receive the fitting component in a form-fit manner. For example, the fitting component can be a projection, which brings about a form-fit connection between the fitting and one of the at least one opening of the adapter element. The projection of the fitting can thus have a defined cross-sectional shape, which corresponds to a cross section of the at least one opening of the adapter element. In addition, a sheath-shaped adapter component can also be fitted on the at least one opening of the adapter element, which component has an (internal) cross section that corresponds to the cross section of the projection of the fitting. Due to this "lengthening" of the opening in the depth direction of the adapter element, a form-fit and/or torsionally secure bond can also be created between the fitting component and the adapter element.

Likewise, alternatively or in addition, the at least one opening of the adapter element can be configured so that the fitting component is attached by a fastener to the adapter element. For example, the fitting component can be a threaded rod, a threaded bolt or a similar fastener, which protrudes at one end of the fitting. The fitting can thus be attached to the adapter element frictionally by means of a nut, which is screwed onto the threaded rod or the threaded bolt, after the fitting component was guided through the at least one opening of the adapter element.

The at least one opening of the adapter element can further be configured to route a water pipe and/or electric cable at least partially through the adapter element. In the case that the fitting component is a detachable or integral part of the fitting, the water pipe and/or electric cable can be routed through an opening of the at least one opening of the adapter element other than the opening that is used for the form-fit connection to the fitting component of the adapter element.

Naturally the fitting component can also be a section of the water pipe and/or electric cable already coupled to the fitting. For example, the water pipe and/or electric cable can protrude from one end of the fitting and be provided with an external thread, onto which a nut or similar fastener can be screwed on a side of the adapter element facing away from the fitting, after the fitting component was led through the opening of the adapter element.

The adapter element can further be configured so that the water pipe and/or electric cable runs inside the adapter element (in the depth direction of the adapter element) and the water pipe and/or electric cable is led out of the adapter element through an opening in the circumferential guide surface of the adapter element. For example, the water pipe and/or electric cable can be provided with a curvature or an elbow. This facilitates a space-saving fitting mount, which has a very small depth in particular.

Furthermore, the adapter element can have several openings, wherein different groups of openings are used to affix different types of fittings. In other words, a first group of openings is used to affix a first type of fitting, while a second group of openings of the adapter element is used to affix a second type of fitting. Naturally one or more of the openings can be both part of the first and of the second group, and the adapter element can also have more than two groups of openings.

Alternatively or in addition to the implementation variants described, the second attachment device of the basic mount and the coupling device of the adapter element can have corresponding guide surfaces and/or openings for receiving a common fastener. In a simple embodiment the basic mount has on its internal guide surface a projection with an opening, into which a fastener, for example a screw or bolt, can be inserted and connected frictionally to the inside of the opening in the projection. An internal thread can be provided on the inside of the opening of the projection for this, or the fastener has a self-tapping thread, which engages frictionally in the material of the projection.

Alternatively to a separate fastener, a pin, a bolt or a threaded rod can also be provided on the adapter mount, which pin, bolt or threaded rod can be introduced into the opening in the projection of the basic mount, while the circumferential guide surface of the adapter element slides along the internal guide surface of the basic mount. In other words, the pin, the bolt or the threaded rod is arranged on the adapter mount parallel to the circumferential guide surface of the adapter element. In the case of a pin or bolt, a clamping element can be provided on the pin or bolt or on the projection of the basic mount for the frictional connection between adapter element and basic mount. In the case of a threaded rod, a nut can be screwed onto the threaded rod and create a frictional connection between adapter element and basic mount on a rear side of the projection.

According to another implementation variant, the fitting mount can comprise a covering panel, which is configured to be affixed between the adapter element and a fitting. Here the covering panel can be attached to the fitting mount itself or be clamped between the fitting and the adapter element by a fastening of the fitting to the adapter element. The covering panel is dimensioned so that it covers at least the fitting mount. Since the covering panel is arranged between the adapter element and the fitting, it brings about an indirect coupling of an end portion of the fitting with the adapter element.

The adapter element can further have at least one projection. Accordingly, the covering panel can have at least one corresponding receptacle, into which a projection protrudes when the covering panel is mounted on the adapter element. The at least one projection can be arranged on the plate of the adapter element forming a front and can extend in the direction of the covering panel and fitting to be affixed. The at least one receptacle of the covering panel can be a depression in the covering panel on the side facing the adapter element. Alternatively, the receptacle of the covering panel can also constitute a continuous opening through the covering panel. By the arrangement of at least two projections on the adapter element and at least two corresponding receptacles on the covering panel, the covering panel can be held or attached in a torsion-proof manner on the adapter element. Alternatively, even a single projection with a non-circular shape and a correspondingly formed receptacle or opening in the covering panel can achieve a torsion-proof attachment.

Alternatively or in addition, the covering panel can have at least one opening, which is configured to receive a fitting component, wherein the at least one opening corresponds respectively to one of the at least one opening of the adapter element when the covering panel is affixed on the adapter element. In this case the at least one opening of the covering panel can have a shape that corresponds to one or more of the optional projections on the adapter element. For example, the at least one opening of the covering panel can encompass a circumferential projection on the adapter element when the covering panel is arranged on the adapter element.

The adapter element can further have more openings than the covering panel, if, for example, openings in the adapter element are used to attach the adapter element to the basic mount. In addition, the adapter element can have more openings than the covering panel, in order to satisfy the affixing of different types of fitting and thus different covering panels.

Alternatively or in addition, the fitting mount can further comprise a fitting connection element, which is configured to be introduced at least partially into the fitting and to be attached to the fitting. The fitting connection element can have, for example, one or more projections, which is/are inserted into the fitting. The one or more projections can be executed in this case so that it/they has/have a snap element, for example in the form of a widening of an end of a projection. The snap element(s) can be introduced into a corresponding receptacle in the fitting and attached there, for example by one or more spring elements.

The fitting connection element can further be configured to be attached to the adapter element and/or the covering panel. Thus, the covering panel can have at least one integrated fastener, onto which the fitting connection element can be fitted and attached thereto. Alternatively or in addition, the covering panel can have an opening, to which the fitting connection element can be attached, for example by a screw. In this case also the adapter element can additionally have an opening, in order to offer room for an attachment element or to attach a fastener from the fitting connection element to the adapter element. For example, a screw can be attached through an opening in the fitting connection element and through an opening in the covering panel in a corresponding opening of the adapter element (for example, either by means of an internal thread in the opening of the adapter element or by means of self-tapping screw).

In another alternative embodiment, the fitting connection element can be formed in one piece with the covering panel.

According to another embodiment, the fitting mount can further comprise a seal, which is arranged between the adapter element and the covering panel. The seal prevents a penetration of liquid or other impurities into the fitting mount.

In one embodiment variant, the seal can have a thickening, which is configured to be laid in a form-fit manner in a corresponding depression of the adapter element. For example, the depression can run circumferentially on a plate of the adapter element forming a front and the seal can have a shape that corresponds at least to the circumference of the plate of the adapter element forming a front. By laying the seal with its thickening into the corresponding depression of the adapter element, the seal can be secured against slippage during affixing of the fitting and/or covering panel.

Alternatively or in addition, the seal can comprise a continuation running in the depth direction of the fitting mount. The continuation of the seal can be configured to encompass the basic mount and/or the adapter element at least partially, i.e., run along its outer edge.

In another embodiment variant, the covering panel can have at least one opening, which is configured to receive a further element. For example, the opening of the covering panel can be configured to receive a soap dispenser or an actuating element of a mechanism for opening and closing a washbasin drain. The opening of the covering panel can be arranged anywhere on the covering panel. For example, an opening for an actuating element of a washbasin drain can be arranged closer to a section of the covering panel to which the fitting is attached than an opening for a soap dispenser.

According to a second aspect, a vehicle washroom is provided, which comprises a fitting mount according to the first aspect or one of its embodiment variants.

According to a third aspect, a vehicle is provided with a fitting mount according to the first aspect or one of its embodiment variants.

Even if some of the aspects and details described above were described with reference to the fitting mount, these aspects can also be realized in a corresponding manner in a wall or other module of a vehicle washroom. Furthermore, the features described of the fitting mount should not be understood as standalone features. On the contrary, all features of the fitting mount can be combined with any number of other features described.

BRIEF DESCRIPTION OF THE DRAWINGS

Further features, attributes, advantages and possible variations become clear to a person skilled in the art by means of the following description, in which reference is made to the enclosed drawings. Here all features described and/or illustrated visually show the object disclosed here by themselves or in any combination. The dimensions and proportions of the components shown in the figures are not to scale.

The present invention is to be explained further by means of figures. These figures show schematically.

DETAILED DESCRIPTION OF THE PREFERRED EMBODIMENTS

In the following, without being restricted hereto, specific details are described to deliver a complete understanding of the present invention. However, it is clear to a person skilled in the art that the present invention can be used in other exemplary embodiments, which may deviate from the details described below. The figures are also used only for the purpose of illustrating exemplary embodiments. They are not true to scale and are only intended to reflect the general concept of the invention by way of example. For example, features that are contained in the figures should by no means be considered as a necessary constituent.

Comparable or identical components and features and those with an identical effect are each provided with the same reference signs in the figures. In some cases, reference signs of individual features and components have been omitted in the figures for reasons of clarity, wherein these features and components are provided with reference signs in other figures.

In the present description, reference is made to one or more "fasteners." Any suitable fixture or device that facilitates the attachment of two components, parts, etc., is to be understood by this. Only by way of example and not conclusively, a screw (with standard thread and/or self-tapping), a threaded rod, a nut, an internal thread, a pin or bolt (with or without clamping element), a snap element, a rivet and a glued joint are cited as fasteners.

Figure 1:
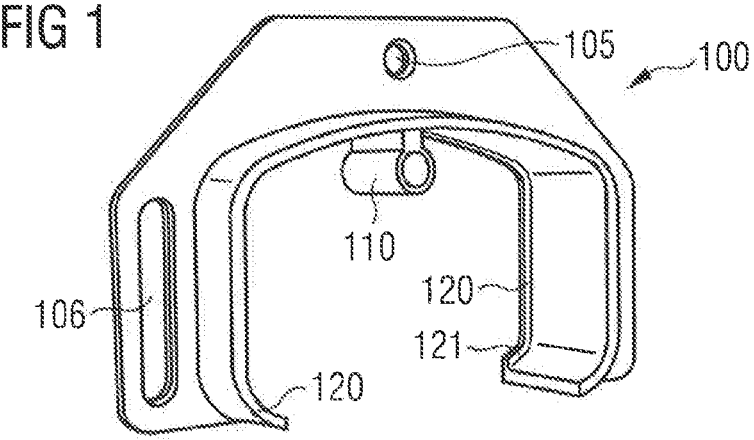
FIG. 1, a view in perspective of a basic mount of a fitting mount.

FIG. 1 shows a schematic view in perspective of a basic mount 100 of a fitting mount. The basic mount 100 has a first attachment device 105 and a second attachment device 110. The first attachment device 105 is used to attach the basic mount 100 (and thus the fitting mount). For example, the basic mount 100 can have a flat, disc-shaped component, in which the first attachment device 105 is provided in the form of an opening for receiving a fastener, which is attached to a wall or another module of a vehicle or of a vehicle washroom. In addition, the basic mount 100 can also have one or more attachment devices 106, in order to align the basic mount 100 on the wall or the module and likewise attach it. The basic mount 100 can be affixed in a torsion-proof manner by one or more other attachment devices 106. The other attachment device 106 shown in FIG. 1 can be arranged at the same time on both sides of the basic mount 100 (in FIG. 1 the corresponding right-hand area of the basic mount 100 is concealed, however).

In addition, the basic mount 100 can comprise a second attachment device 110. This second attachment device 110 is used for the coupling to and the detachable attachment of an adapter element, which is described below in greater detail. For example, the second attachment device 110 can be a cylindrical component, which has an opening for receiving a fastener.

Furthermore, the basic mount 100 can have an internal guide surface 120, which is configured to at least partially encompass a circumferential guide surface of the adapter element. In FIG. 1 the internal guide surface 120 is formed by a component which is arranged substantially perpendicular to the flat, disc-shaped component of the basic mount 100. In other words, the flat, disc-shaped component of the basic mount 100 forms a flange, which is arranged on an outside of the component forming the internal guide surface 120. This component forming the internal guide surface 120 can be arranged on a front and/or rear side (in the viewing direction of FIG. 1) of the flat, disc-shaped component of the basic mount 100. The arrangement on only one side makes it possible to affix the basic mount to a continuous wall or module. However, if the wall or module should have an opening or receptacle for a fitting mount, the component forming the internal guide surface 120 can also be arranged partially or wholly on a side of the basic mount 100 facing the opening or receptacle in the wall or the module. For example, lines can run in the wall or in the module, which emerge at a suitable opening or receptacle to be connected to a fitting.

The basic mount 100 can be formed in one piece. This means that the disc-shaped component, the component forming the internal guide surface 120 and/or the cylindrical component of the basic mount 100 forming the second attachment device 110 can be formed integrally. Alternatively, one or more of the components of the basic mount 100 can be manufactured separately and assembled with the other component(s) into the basic mount 100 and connected to one another.

Figure 2A:
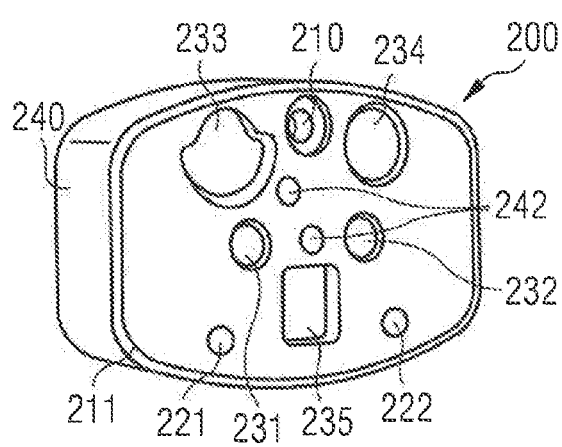
FIGS. 2*a* and 2*b*, a view in perspective of a first type of (a) an adapter element of a fitting mount and (b) the adapter element inserted into a basic mount, FIGS. 3*a* and 3*b*, a view in perspective of a second type of (a) an adapter element of a fitting mount and (b) the adapter element inserted into a basic mount, FIGS. 4*a* and 4*b*, a view in perspective of (a) a covering panel, which is affixed to a fitting mount with the first type of adapter element, and (b) the further arrangement of a fitting on such a covering panel, FIGS. 5a and 5b, a sectional view of (a) the adapter mount with covering panel and fitting along the section line A-A from FIG. 4 and (b) a detailed view of a seal from this sectional view, FIGS. 6a and 6b, a view in perspective of (a) a covering panel, which is affixed to a fitting mount with the first type of adapter element, and (b) the further arrangement of a fitting on such a covering panel, FIG. 7, a view in perspective of the covering panel from FIG. 6 with a fitting connection element additionally affixed on the covering panel, FIGS. 8a and 8b, a sectional view of (a) the adapter mount with covering panel and fitting along the section line B-B from FIG. 6 and (b) a detailed view of a seal from this sectional view, FIGS. 9a and 9b, a view in perspective of (a) a covering panel, which is affixed to a fitting mount with the second type of adapter element, and (b) the further arrangement of a fitting on such a covering panel, FIGS. 10a and 10b, a sectional view of (a) the adapter mount with covering panel and fitting along the section line C-C from FIG. 9 and (b) a detailed view of a seal from this sectional view, FIGS. 11a-11e, a view in (a) perspective, (b) front view, (d) side view and (e) sectional view of a basic mount of a fitting mount and (c) a view in perspective of a basic mount and an adapter element, FIGS. 12a-12e, (a-d) front views in perspective of different embodiments of an adapter element and (e) a rear view in perspective of one of these embodiments, FIGS. 13a-13f, the schematic sequence of an installation of a fitting by means of a fitting mount of a first embodiment, FIGS. 14a-14c, a view (a) in perspective of a section of a washroom with installed fitting mount and (b, c) two sectional views of the installed fitting mount, FIGS. 15a-15e, the schematic sequence of and installation of a fitting by means of a fitting mount of a second embodiment, FIGS. 16a-16e, the schematic sequence of an installation of a fitting by means of a fitting mount of a third embodiment, and FIGS. 17a-17d, the schematic sequence of an installation of a fitting by means of a fitting mount of a fourth embodiment.
Figure 2B:
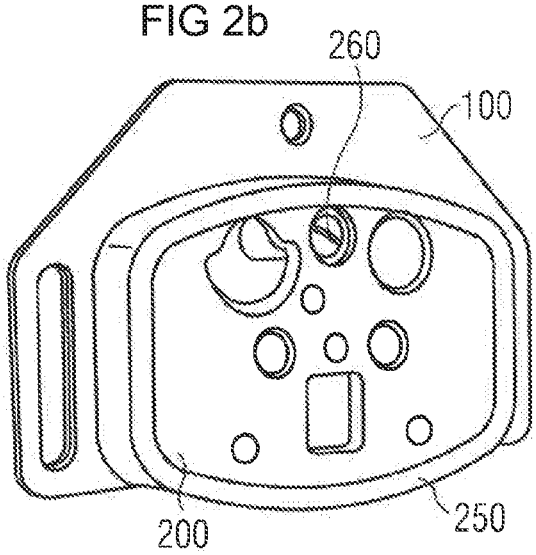

FIGS. 2a and 2b show a schematic view in perspective of a first type of an adapter element 200 of a fitting mount (a) and the adapter element 200 inserted into a basic mount 100 (b). The adapter element 200 likewise has a first flat, disc-shaped component, from which a second component extends substantially perpendicular thereto.

The adapter element 200 can also be formed in one piece. Alternatively, the components of the adapter element can be manufactured separately and assembled and connected to one another.

In the perspective drawings of a fitting mount described here, a front side of the fitting mount and its constituents are shown visibly. The front side is the side on which a fitting is affixed. The rear side is accordingly (usually) not visible. A depth direction of the fitting mount and its constituents extends from the front side to the rear side.

The first component of the adapter element 200 has a coupling device 210, in order to be coupled to the second attachment device 110 of the basic mount 100 and attached detachably to the second attachment device 110. The coupling device 210 can constitute an opening in a simple embodiment, through which opening a fastener 260 can be led, which creates a frictional connection with the second attachment device 110 of the basic mount 100. In addition, the coupling device 210 can comprise a depression, in which a head of the fastener 260 can be received, and thus does not stick out from the first flat, disc-shaped component of the adapter element 200.

Alternatively or in addition, the coupling device 210 of the adapter element 200 can also comprise components that at least partially enclose or encompass the second attachment device 110 or otherwise create a coupling between the adapter element 200 and the basic mount 100. Thus, corresponding guide surfaces and/or openings for receiving reciprocal components can be provided on the coupling device 210 of the adapter element 200 and on the second attachment device 110 of the basic mount. Thus, for example, beside the fastener 260, a component (not shown) can be arranged on the rear side of the adapter element 200, which component at least partially encloses an outside of the second attachment device 110 of the basic mount 100 (FIG. 1). Such a component of the adapter element 200 can be cylindrical with a slot-shaped opening directed upwards in FIG. 2, the inner surface of which can slide along the outer surface of the second attachment device 110 of the basic mount 100 and in doing so couples the adapter element 200 to the basic mount 100 in a form-fit manner.

In the first flat, disc-shaped component of the adapter element 200, at least one opening 231-235 is provided, which is configured to receive a fitting component. Here the at least one opening 231-235 can be configured so that it receives the fitting component in a form-fit manner. For example, an opening 233, 234, 235 (or several openings) of the at least one opening 231-235 can have an opening cross section that corresponds to the fitting component (for the most part), so that an inside of the opening 233, 234, 235 rests at least partially on the fitting component in a form-fit manner. At least one section of a line, which is led from an inside of the adapter element 200 through one of the at least one opening 231-235 to the front side of the adapter element 200, is also possible as a fitting component. The fitting can be attached to an end section of such a line, which protrudes via the flat, disc-shaped component of the adapter element 200.

Alternatively, the fitting component can also be already connected to the fitting and be led from the front side of the adapter element 200 through one of the at least one opening 231-235 in the depth direction of the adapter element 200 into the adapter element 200. In this case the same and/or another opening of the at least one opening 231-235 can be configured to lead a line from/to the fitting through the adapter element. For example, a water pipe of the fitting can lead through one opening 231 and an electric cable lead to/from the fitting through another opening 232. Lines of the fitting can naturally also be led through openings 233-235, which form a form fit with a fitting component.

In another embodiment the adapter element 200 can have at least one projection 242. The at least one projection 242 can be arranged on a front side (a side facing the fitting) on the first, flat, disc-shaped component of the adapter element 200 and extend in the direction of the front side. This at least one projection 242 is used for the form-fitting connection to other construction elements, including the fitting.

The adapter element 200 further has a circumferential guide surface 240. The circumferential guide surface 240 can be formed by a second component of the adapter element 200, which extends substantially perpendicular to an outside of the first flat, disc-shaped component of the adapter element 200. The first component of the adapter element 200 can be provided in this case, as shown in FIG. 2a, on a front edge of the second component of the adapter element 200. Alternatively, the first component of the adapter element 200 can be arranged on a rear side of the second component of the adapter element or at a position between the front edge and the rear side of the second component of the adapter element 200. An installation space on the front side for the fitting and/or a rear-side installation space for lines and/or fasteners can be formed by this as required.

In FIG. 2b, a fitting mount is shown which comprises a basic mount 100 and an adapter element 200 inserted into the basic mount 100 and attached. The adapter element 200 is pushed here with its circumferential guide surface 240 along the internal guide surface 120 of the basic element 100 into a region inside the internal guide surface 120. A fastener 260 is then led through the opening 210 in the adapter element 200 and fastened in the second attachment device 110 of the basic mount 100. The circumferential guide surface 240 of the adapter element 200 can have openings or (in a circumferential direction) gaps, in order to receive elements of the basic mount 100, such as the second attachment device 110, for example.

On its rear side (a side facing away from the fitting) the basic mount 100 can have an edge 121 facing inwards (FIG. 1). For example, the edge 121 facing inwards can run along an edge of the internal guide surface on the rear side. This inward facing edge 121 acts as a stop for the adapter element 200, due to which (in particular following attachment by the fastener 260) a further form fit is created between the adapter element 200 and the basic mount 100.

The fitting mount can further comprise a seal 250, which seals a section line (section edge) between the basic mount 100 and the adapter element 200. This prevents liquids or other impurities from getting between the basic mount 100 and the adapter element 200 or behind the basic mount 100.

Figure 3A:
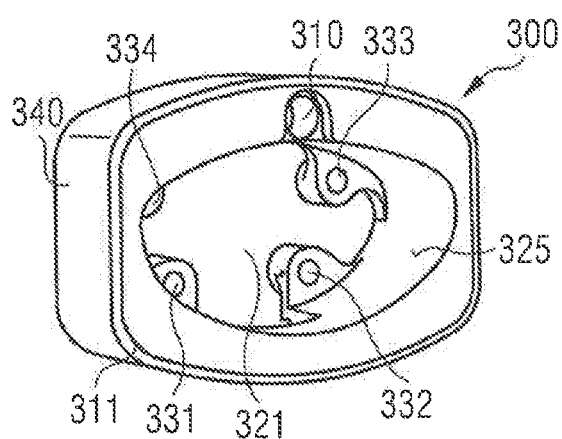
Figure 3B:
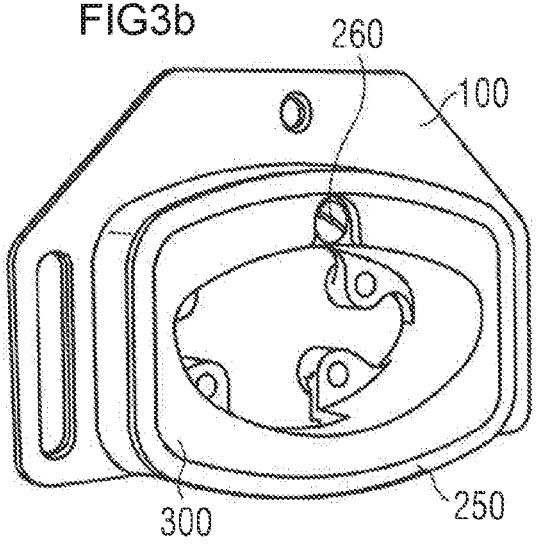

FIGS. 3a and 3b show a schematic view in perspective of a second type of an adapter element 300 of a fitting mount (a) and the adapter element 300 inserted into a basic mount 100 (b). Elements and components of the adapter element 300 of the second type that correspond to elements and components of the adapter element 200 of the first type or have the same function are provided with reference symbols that correspond to those of the adapter element 200 of the first type plus the value 100.

The adapter element 300 thus has a first flat, disc-shaped part, in/on which a coupling device 310 is provided, which can be designed in the same way as the coupling device 210 of the adapter element 200. The adapter element 300 likewise has a circumferential guide surface 340, which corresponds to the circumferential guide surface 240 of the adapter element 200 of the first type.

In contrast to the adapter element 200 of the first type, the adapter element 300 of the second type has a single large opening 321, which is configured to receive a fitting component. The opening 321 has an internal guide surface 325, along which an outer surface of the fitting component can slide, whereby a form fit is created between the fitting (component) and the adapter element 300.

For a frictional bond between fitting (component) and adapter element 300, attachment elements 331-334 are provided on the rear side (on the side facing away from the fitting). These attachment elements 331-334 can have an opening, through which a fastener (screw, pin, bolt etc.) can be led, which creates a frictional connection with the fitting component, which is introduced into the opening 321. Here the fastener can be led from the front side of the adapter element 300 through the fitting component into the corresponding attachment element 331-334 or from the rear side of the adapter element 300 through the corresponding attachment element 331-334 into the rear side of the fitting component.

As can be recognized in FIG. 3b, the same basic mount 100 can be used for the adapter element 300 of the second type as can also be used for the adapter element 200 of the first type. Due to the interplay of the internal guide surface 120 of the basic mount 100 and the circumferential guide surface 240, 340 of the adapter element 200, 300, different adapter elements 200, 300 can be inserted into the same basic mount 100.

The fitting mount with the adapter element 300 of the second type can also be equipped with a seal 250, which is of the same shape and size as the seal 250 in FIG. 2.

An adapter element 200, 300 can be configured for a certain fitting type, but alternatively can also be used for several fitting types. Only the position, size and arrangement of the openings 231-235, 321 and if applicable the attachment elements 331-334 must be adapted to one or more fitting types.

Figure 4A:
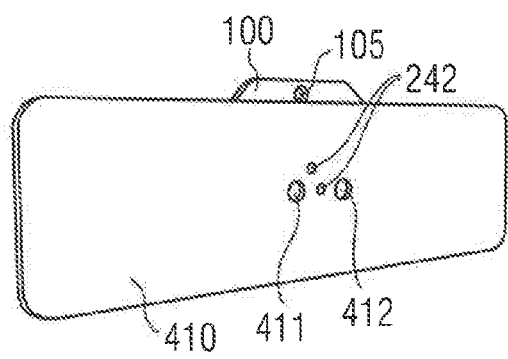
Figure 4B:
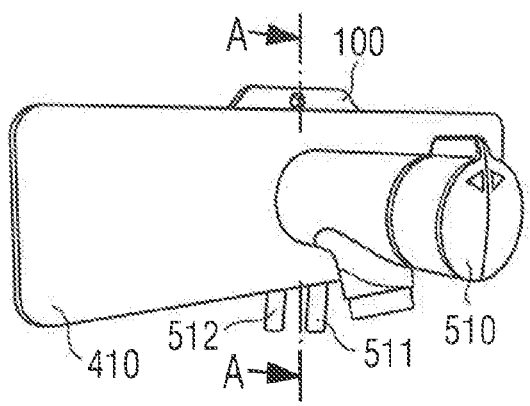

FIGS. 4a and 4b show a schematic view in perspective of a covering panel 410, which is affixed to a fitting mount with the first type of adapter element 200 (FIG. 4a), and the further arrangement of a fitting 510 on such a covering panel 410 (FIG. 4b). The covering panel 410 is configured in this case to be affixed between the adapter element 200 and the fitting 510. The covering panel 410 can have at least one receptacle for this, into which the at least one projection 242 of the adapter element 200 protrudes. In FIG. 4a two receptacles of the covering panel 410 are shown as openings (for example, respective holes), into which a projection 242 of the adapter element 200 protrudes in each case.

The covering panel 410 further has at least one opening 411, 412, which is configured to receive a fitting component. From a comparison of FIGS. 2a and 4a, it is to be recognized that the opening 411 of the covering panel 410 corresponds to the opening 231 of the adapter element 200 and the opening 412 of the covering panel 410 corresponds to the opening 232 of the adapter element 200, i.e., the two openings coincide with one another when the covering panel 410 with its receptacles (openings) is placed onto the projections 242 of the adapter element 200.

According to one embodiment, such as is shown in FIG. 4a, the covering panel 410 can be configured so that it only partially covers the basic mount 100 of the fitting mount. For example, a section of the basic mount 100, in which the first attachment device 105 of the basic mount 100 is arranged, cannot be covered by the covering panel. It is thereby possible to lead a fastener through the attachment device 105 of the basic mount 100 and attach it to a wall or another module. An exchange of the fitting mount and covering panel 410 can be carried out quickly and easily due to this easy access to the attachment device 105.

The fitting 510 shown in FIG. 4b can be attached to the fitting mount in that at least one fitting component is led through an opening 231, 232 of the adapter element 200 and the corresponding opening 411, 412 of the covering panel 410. For example, one or more lines, such as a water pipe 511 and/or an electric cable 512, can be led from/to the fitting through the covering panel 410 and the adapter element 200. The fitting can be attached to an end section of such a line 511, 512, which protrudes on a front side of the adapter element 200 and if applicable on the front side of the covering panel 410.

Figure 5A:
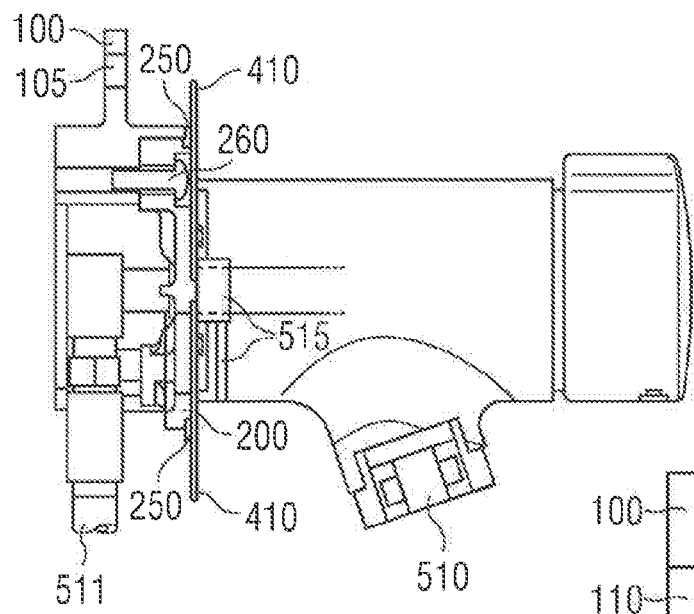
Figure 5B:
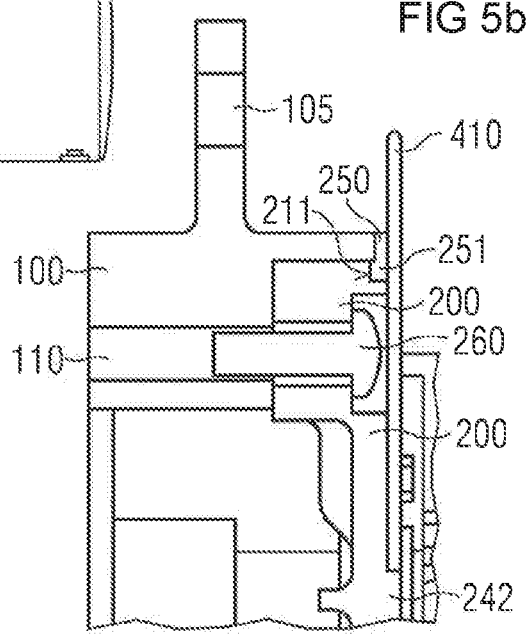

This is to be recognized in FIG. 5a, which shows a schematic sectional view of an adapter mount with covering panel 410 and fitting 510 along a section line A-A shown in FIG. 4b as well as a detailed view (FIG. 5b) of a seal from this sectional view. In FIG. 5a a water pipe 511 is shown, which is connected to the fitting 510 via an elbow. The section of the water pipe 511 that protrudes into the fitting represents, for example, a fitting component. An end of the water pipe 511 pointing to the right in FIG. 5a protrudes beyond the covering panel 410. The fitting 510 is placed onto this protruding end of the water pipe 511 and the fitting 510 is attached to the end of the water pipe 511 (the fitting component) by a fastener 515. Alternatively, the water pipe 511 can also be attached to the fitting 510 and protrude from the rear side of the fitting 510. In this case the fitting 510 can be attached by a fastener (for example, a nut not shown in FIG. 5a) to the rear side of the flat, disc-shaped component of the adapter element 200.

The water pipe 511 can be arranged in the fitting mount so that it is received completely in the adapter element 200. Here the basic mount 100 has an opening at its lower end through which the water pipe 511 can be led. This opening, in particular in the internal guide surface 120, is shown in FIG. 1 as a complete interruption of the internal guide surface 120. Naturally the opening for one or more lines 511 can also interrupt the internal guide surface 120 only partially. The circumferential guide surface 240 of the adapter element 200 correspondingly also has an opening in and/or interruption of the circumferential guide surface 240.

It is further to be recognized from FIG. 5a that the basic mount 100 can be attached via an attachment device 105 to any wall or module of a vehicle and that the attachment device 105 is accessible above the covering panel 410. The adapter element 200 is coupled by fastener 260 through the coupling device 210 and the first attachment device 105 of the basic mount 100 to the latter and attached detachably to it.

A seal 250 is further arranged between the covering panel 410, the basic mount 100 and the adapter element 200. As is recognizable in the detailed view in FIG. 5b, the seal 250 can optionally have a thickening 251, which is designed to be inserted into a corresponding depression 211 of the adapter element 200 in a form-fit manner. The seal 250 can thereby be affixed to the fitting mount (comprising adapter element 200 and basic mount 100) without the seal 250 being able to slip during the placing of the covering panel 410 and/or the fitting 510.

FIG. 6a shows a schematic view in perspective of another covering panel 420, which is affixed to a fitting mount with the first type of adapter element 200, and the further arrangement (FIG. 6b) of a fitting 520 on such a covering panel 420. Corresponding to the covering panel 410 from FIG. 4a, the covering panel 420 has receptacles (for example, openings), into which the projections 242 of the adapter element 200 protrude. The position of the covering panel 420 relative to the adapter element 200 is determined by this.

In contrast to the covering panel 410 from FIG. 4a, the covering panel 420 from FIG. 6 has other openings. Firstly, the openings 421, 422 and 423 serve to receive a respective fitting component, for example a water pipe 511, an electric cable 512 and/or a fitting component for attaching the fitting 520 to the fitting mount (in particular to the adapter element 200). The openings 421-423 correspond here to the openings 233, 234 and 235 of the adapter element 200, i.e., lie over these, when the covering panel 420 is arranged by means of its receptacles and the projections 242 of the adapter element 200 on the fitting mount. The adapter element 200 can thereby be used for different covering panels 410, 420 and different fittings 510, 520 on account of its envisaged openings 231-235 (see FIGS. 2a, 4a, 4b, 6a and 6b).

The covering panel 420 also has other openings 424-426, through which fasteners can be led to affix and fasten other parts of the fitting mount on the adapter element 200. Thus, a fitting connection element 450 can be affixed for one fitting type (for example, fitting 520) on the covering panel 420 as shown in FIG. 7. The fitting connection element 450 has at least one opening, which corresponds to the other openings 424-426 of the covering panel 420 and the openings 210, 221, 222 of the adapter element 200. The fitting connection element 450 can thus be attached together with the covering panel 420 to the adapter element 200 by fastener 260 and further fasteners 460. Alternatively, the fitting connection element 450 can be produced in one piece with the covering panel 420. The fitting connection element 450 has at least one projection 455, 456, which is configured to be introduced at least partially into the fitting 520 and to be attached to the fitting 520.

The fitting connection element 450 can further have openings 451, 452, 453, through which the lines of the fitting 520 and/or at least one other fitting component can be led. When the fitting connection element 450 is attached to the covering panel 420, the openings 451-453 correspond to the openings 421-423 of the covering panel 420, so that the lines and/or fitting component(s) can also be led through the covering panel 420 and the adapter element 200.

The fitting 520 can be affixed to the fitting mount even independently of the arrangement of a fitting connection element 450. FIG. 8a shows a schematic sectional view of an adapter mount with covering panel 420 and fitting 520 along the section line B-B from FIG. 6a and a detailed view (FIG. 8b) of a seal 250 from this sectional view. The sectional view in FIG. 8a faces in the opposite direction to the sectional view in FIG. 5a. Therefore, no water pipe 511 (FIG. 5a) is shown in FIG. 8a. Instead of this, an electric cable 512 is visible, which is led through the corresponding opening 421 of the covering panel 420 and opening 233 of the adapter element 200 (as well as optionally the opening 451 in the fitting connection element 450). At the end of the electric cable 512 shown a normal connection of the electric cable can be made to a power supply. The electric cable 512 can be used for the electrical connection of a sensor 521, which permits a contactless activation of the water dispensing of the fitting 520.

As is to be recognized in FIG. 8a, the fastener 260 is used to connect the fitting connection element 450, the covering panel 420, the adapter element 200 and the basic mount 100 to one another. This reduces the number of fasteners when affixing the fitting 520 and thus shortens the assembly time of the fitting 520.

In this embodiment also, a seal 250 with optional thickening 251 is provided. The seal 250 can, as shown in FIG. 2a, seal the entire section edge between basic mount 100 and adapter element 200.

Figure 9A:
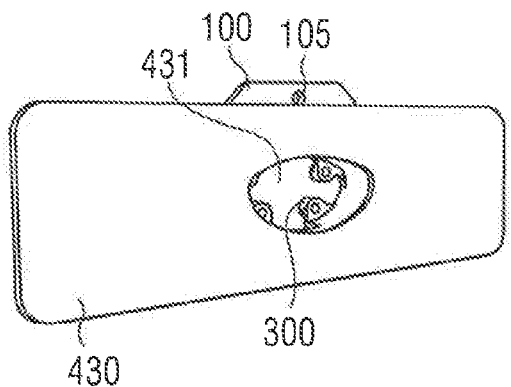

FIG. 9a shows a schematic view in perspective of another covering panel 430, which is affixed to a fitting mount with the second type of adapter element 300, and the further arrangement (FIG. 9b) of a fitting 530 on such a covering panel 430. The covering panel 430 differs from the covering panels 410 (FIG. 4a) and 420 (FIG. 6a) in particular in that only a single opening 431 is provided. The covering panel 430 can be placed here with its opening 431 in a form-fit manner onto the fitting 530, before the fitting 530 is inserted into the adapter element 300 of the second type. The projections 242 of the adapter element 200 of the first type and the corresponding receptacles in the covering panel 410, 420 are thereby eliminated.

Alternatively, the fitting 530 can also be formed in two parts. In this case the covering panel 430 is placed onto a fitting plinth (not shown explicitly) and inserted into the opening 321 of the adapter element 300.

Figure 9B:
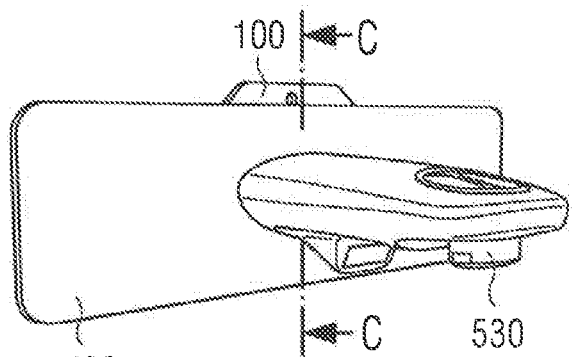
Figure 10A:
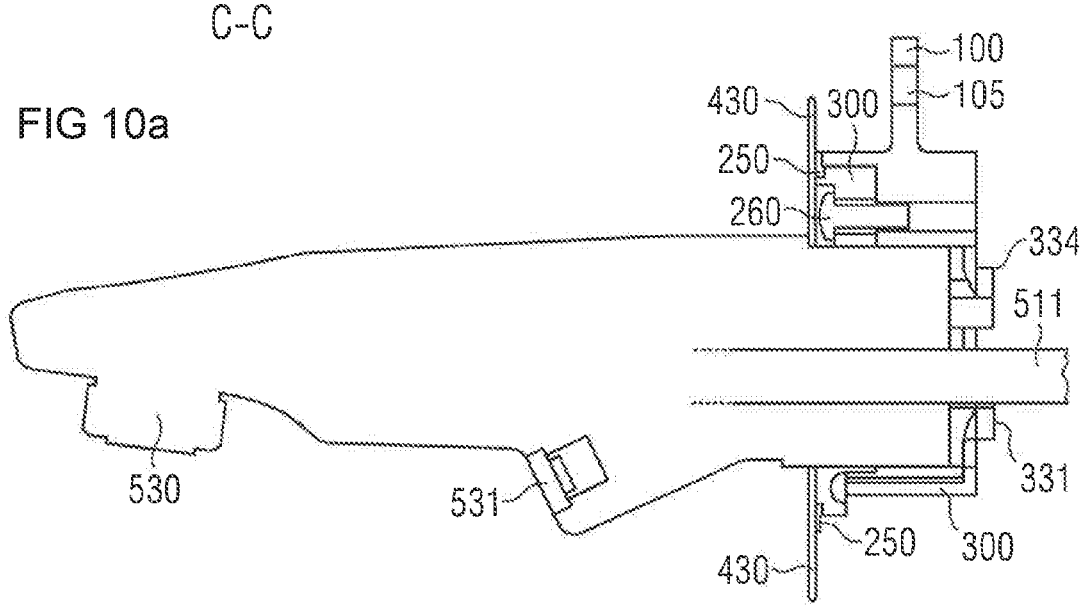
Figure 10B:
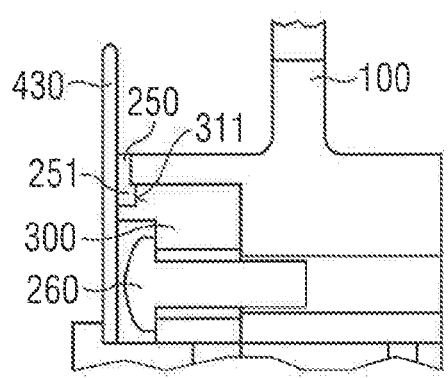

FIG. 10a shows a schematic sectional view of the adapter mount with covering panel 300 and fitting 530 along the section line C-C from FIG. 9, as well as a detailed view (FIG. 10b) of a seal 250 from this sectional view. When affixing the adapter element 300 and the fitting 530, first the adapter element 300 is inserted into the basic mount 100 and attached detachably to the basic mount by means of fastener 260. Then the seal 250 is affixed. For example, the optional thickening 251 can be laid into a corresponding depression 311 of the adapter element 300, due to which the seal 250 is secured against slippage. Then the covering panel 430 is either placed onto the fitting mount and secured or already pushed onto the fitting 530 or alternatively pushed onto the fitting plinth. The fitting 530, or alternatively the fitting plinth, is then inserted into the opening 321 of the adapter element 300. The fitting 530 or the fitting plinth is then attached detachably to the attachment elements 331-334 by fasteners. In the case of a two-part fitting 530 with fitting plinth, the remaining portion of the fitting 530 is placed onto the fitting plinth and attached to it.

A water pipe 511 and/or electric cable (not shown in FIG. 10a) can be led out at a rear side of the fitting mount (the side facing away from the fitting 530). Alternatively, the water pipe 511 and/or the electric cable can be led to the side, upwards or downwards, as shown in FIG. 5a. In this embodiment also the electric cable is used to connect a sensor 531 to a power supply.

FIGS. 11 to 17 show other embodiments and implementation variants of a fitting mount. The fitting mounts shown and described in FIGS. 11 to 17 show adapter elements that can also be inserted into the basic mount 100 from FIG. 1. Conversely, the basic mount 1100, which is shown in FIGS. 11 to 17, can also be used for the adapter element 200, 300 from FIGS. 2a and 3a.

Figure 11A:
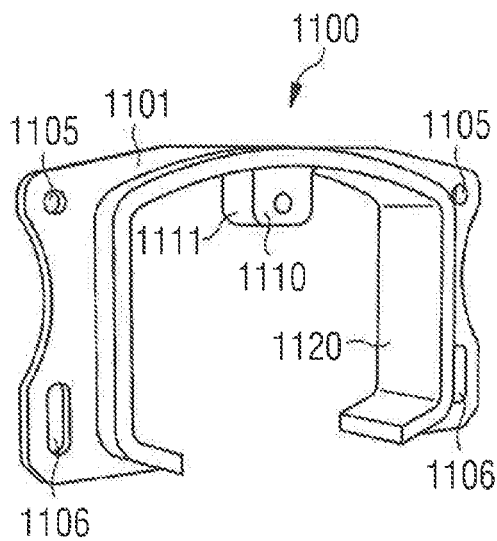
Figure 11B:
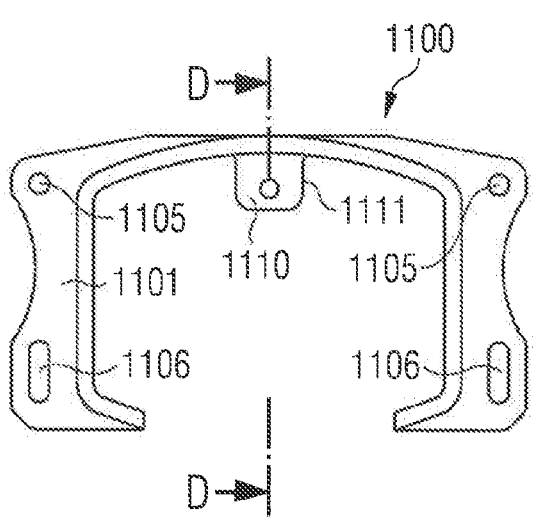
Figure 11C:
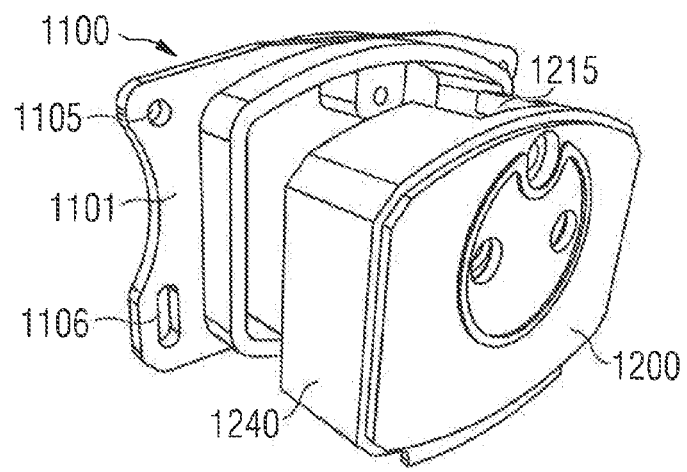
Figure 11D:
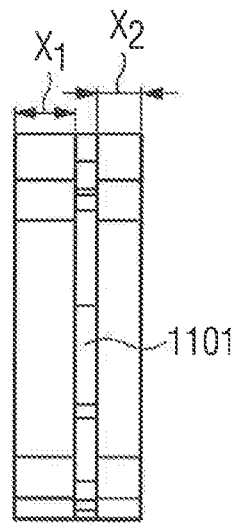
Figure 11E:
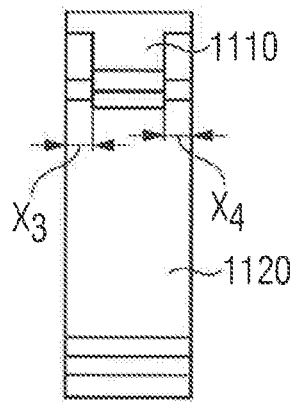

FIG. 11a shows a view in perspective of a basic mount 1100 of a fitting mount, FIG. 11b shows a front view of the basic mount 1100, FIG. 11c shows a view in perspective of the basic mount 1100 and an adapter element 1200, FIG. 11d shows a side view of the basic mount 1100 and FIG. 11e shows a sectional view of the basic mount 1100 along the section line D-D. Like the basic mount 100 shown in FIG. 1 also, the basic mount 1100 shown in FIGS. 11a-11c has a first attachment device 1105 and a second attachment device 1110. The first attachment device 1105 is used to attach the basic mount 1100 (and thus the fitting mount) to a wall or another module of a vehicle or vehicle washroom. The second attachment device 1110 serves for the coupling to and the detachable attachment of an adapter element 200, 300, 1200 and other adapter elements, which will be described in greater detail. For example, the second attachment device 1110 can have an opening for receiving a fastener.

The basic mount 1100 likewise has an internal guide surface 1120, which is configured to at least partially encompass a circumferential guide surface 1240 of the adapter element 200, 300, 1200. The internal guide surface 1120 is formed by a component of the basic mount 1100, which extends substantially in the depth direction of the basic mount 1100. Formed protruding outwards from this is a flange 1101, which comprises the first attachment device 1105, for example in the form of an opening for leading a fastener through. The flange 1101 can be formed in one piece with the component of the basic mount 1100 forming the internal guide surface 1120 or produced separately from this and connected to the component of the basic mount 1100 forming the internal guide surface 1120.

In addition, the basic mount 1100 can also have one or more other attachment devices 1106, in order to align and likewise attach the basic mount 1100 to the wall or the module of the vehicle. The basic mount 1100 can be affixed in a twist-proof manner by one or more other attachment devices 1106. The one or more other attachment devices 1106 can be formed as a slot, whereby an alignment of the basic mount 1100 is facilitated. The first attachment device 1105 and/or the other attachment device 1106 can be arranged on both sides of the basic mount 1100, as is shown, in particular, in FIG. 11b.

The flange 1101 can, as shown in FIG. 11d, be affixed asymmetrically in the depth direction of the basic mount 1100. This has the advantage that the basic mount 1100 can be attached by each of the two sides of the flange 1101 to a wall or a module of the vehicle. In this case the component of the basic mount 1100 forming the internal guide surface 1120 protrudes either by the distance X1 or X2, in each case, plus the thickness of the flange 1101 from the wall or the module of the vehicle. Thus, the same basic mount 1100 can be used for different wall thicknesses or covers of varying thickness. The flange 1101 can naturally also be arranged symmetrically or arranged on one side of the basic mount 1101, i.e., one of the distances X1 or X2 shown in FIG. 11d is equal to zero.

In FIG. 11e, it is to be recognized that the second attachment device 1110 is arranged symmetrically in the inside of the basic mount 1100. The distances X3 and X4 between one side of the second attachment device 1110 and the corresponding front edge or rear edge of the basic mount 1100 are equal in this case and selected so that an adapter element 200, 300 can be installed in the basic mount 1100 flush with the front edge or rear edge of the basic mount 1100. An adapter element 200, 300 can be coupled to the basic mount 1100 and attached thereto independently of the installation direction of the basic mount 1100. Different distances X3 and X4 than those shown in FIG. 11e can naturally also be selected.

The adapter element 1200 shown in FIG. 11c is constructed similarly to the adapter element 200 from FIG. 2a and is used to receive a fitting 510 as already shown in FIG. 4b and described. A description of the same elements for the adapter element 1200 is therefore omitted or this is abbreviated. The adapter element 1200 likewise has a circumferential guide surface 1240. The adapter element 1200 can be inserted thereby in a form-fit manner into the basic mount 1100 or also the basic mount 100, wherein the circumferential guide surface 1240 slides along the internal guide surface 1120 of the basic mount 1100. The adapter element 1200 has an opening or interruption in the circumferential guide surface 1240, which is configured to receive the second attachment device 1110 of the basic mount 1100. For example, the opening or interruption in the circumferential guide surface 1240 can have at least one guide surface 1215 for its part, which abuts a corresponding lateral surface 1111 of the second attachment device 1110 when the adapter element 1200 is inserted into the basic mount 1100. An additional form fit is thereby created between the adapter element 1200 and the basic mount 1100.

Figure 12A:
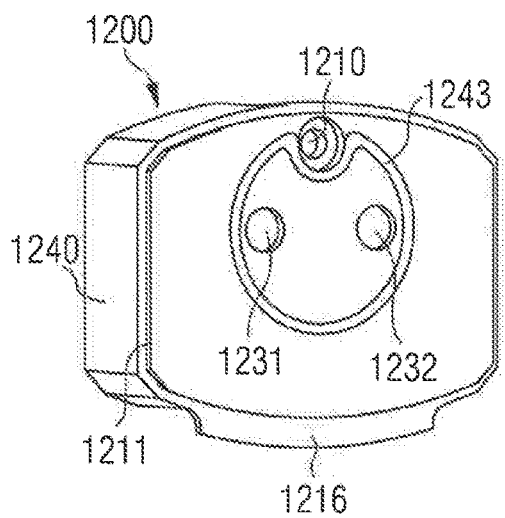
Figure 12B:
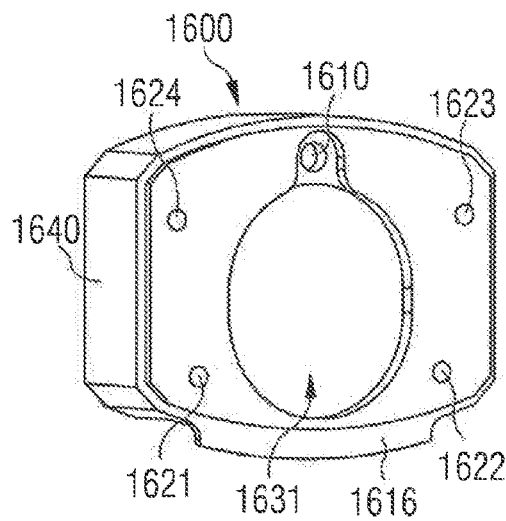
Figure 12C:
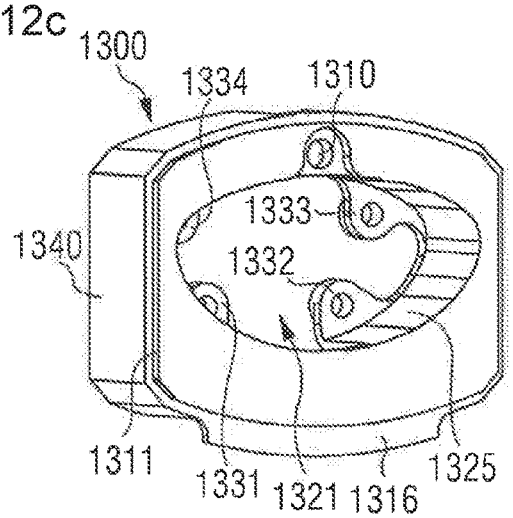
Figure 12D:
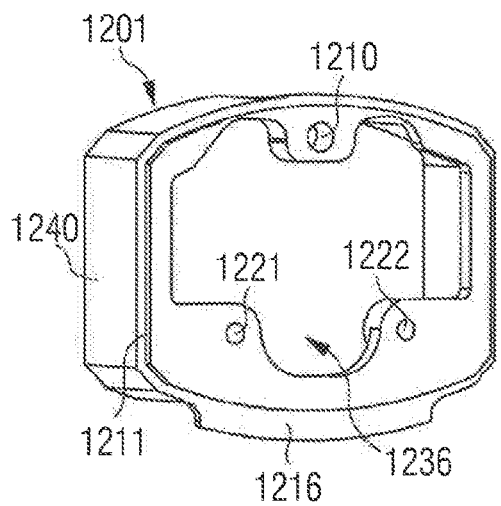
Figure 12E:
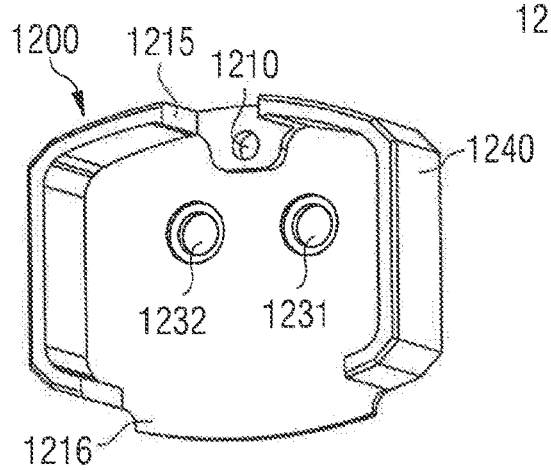

FIGS. 12a-12d show front views in perspective of various embodiments of an adapter element 1200, 1201, 1300, 1600, as well as in FIG. 12e, a rear view in perspective of one of these embodiments. All adapter elements 1200, 1201, 1300, 1600 can be inserted into the same basic mount 1100 or 100. With reference to FIG. 12a, an adapter element 1200 is shown, which is similar to the adapter element 200 from FIG. 2a. The features of the adapter element 1200, which are identical to or have the same function as the features of the adapter element 200, are provided with the same reference signs plus the value 1000. Apart from an attachment device 1210 for attaching the adapter element 1200 to the basic mount 1100, a circumferential guide surface 1240 is provided, which at least partially corresponds to the internal guide surface 1120 of the basic mount 1100.

At least one opening 1231, 1232 is provided to receive a fitting component. This at least one opening 1231, 1232 can have one or all of the features described and shown of the openings 231-235 of the adapter element 200. The at least one opening 1231, 1232 is arranged on a flat, disc-shaped component of the adapter element 1200. A projection 1243 can likewise be located on the flat, disc-shaped component of the adapter element 1200. Finally, the adapter element 1200 has a projection 1216, which extends, for example, in a plane of the flat, disc-shaped component of the adapter element 1200 or a plane parallel to this. The projection 1216 can have a thickness (in the depth direction of the adapter element 1200) that is smaller than the thickness of the flat, disc-shaped component of the adapter element 1200. The projection 1216 is used to close a possible opening or interruption of the internal guide surface 1120 of the basic mount 1100.

FIG. 12b shows another execution variant of an adapter element 1600. This adapter element 1600 also has, apart from an attachment device 1610 for attaching the adapter element 1600 to the basic mount 1100, a circumferential guide surface 1640, which corresponds at least partially to the internal guide surface 1120 of the basic mount 1100. A projection 1616 can also be optionally provided, which can have one or all of the features of the projection 1216 of the adapter element 1200. The adapter element 1600 is characterized by a single large opening 1631, which is configured to receive a fitting component. To attach a covering panel, openings 1621-1624 (for example, holes) are also provided in the flat, disc-shaped component of the adapter element 1600.

Another embodiment is found in FIG. 12c. This variant of an adapter element 1300 largely corresponds to the adapter element 300 from FIG. 3a. The features of the adapter element 1300 that are identical to or have the same function as the features of the adapter element 300 are provided with the same reference signs plus the value 1000. The description of these features is therefore omitted. In addition, a projection 1316 can be arranged on the adapter element 1300 in the same way as the projection 1216 on the adapter element 1200.

While the adapter element 200 from FIG. 2a has openings, which facilitate the affixing of two different fitting types, in the embodiments shown in FIGS. 12a-12d, a separate adapter element 1200 and 1201 (see FIG. 12d) is provided in each case. The adapter element 1201 has a large opening 1236, which is configured to receive a fitting component. Openings 1221, 1222 are further arranged, which correspond to the openings 221 and 222 of the adapter element 200 from FIG. 2a. Here, too, a projection 1216 can be arranged on the adapter element 1201. A detailed description of the other features, which are identified by the same reference signs as the features of the adapter element 1200 in FIG. 12a, is omitted, as they are identical to those of the adapter element 1200.

In FIG. 12e a rear side of the adapter element 1200 from FIG. 12a is shown by way of example. The rear sides of the other adapter elements 200, 300, 1201, 1300, 1600 have a virtually identical construction. Only the opening(s) in the flat, disc-shaped component of the respective adapter element 200, 300, 1201, 1300, 1600 and, if applicable, attachment elements 1331-1334 would differ from the construction shown in FIG. 12e. To be recognized is the opening or interruption in the circumferential guide surface 1240 and a guide surface 1215 of its own for the (form-fit) coupling to the second attachment device 1110 of the basic mount 1100. The coupling device 1210 of the adapter element 200, 300, 1200, 1201, 1300, 1600 can have a thickening extending in the depth direction with respect to the flat, disc-shaped component of the adapter element. This thickening can be dimensioned so that the coupling device 1210 abuts an end side of the second attachment device 1110 of the basic mount 1100, while the adapter element 200, 300, 1200, 1201, 1300, 1600 ends flush with a front edge of the basic mount 1100.

Figure 13A:
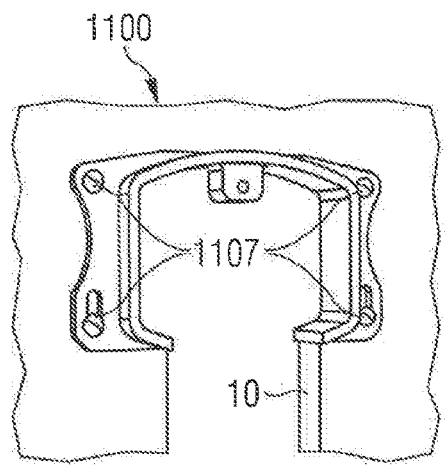

FIGS. 13a-13f show schematically the sequence of an installation of the fitting 510 by means of a fitting mount with a first embodiment of the adapter element 1200. In FIG. 13a the affixing of the basic mount 1100 to a wall 10 or a module 10 of a vehicle is shown first. For example, one or more fasteners 1107 can attach the basic mount 1100 at its first attachment device 1105 to the wall 10 or the module 10. A recess for the basic mount 1100 can be provided for this in the wall 10 or the module 10.

Figure 13B:
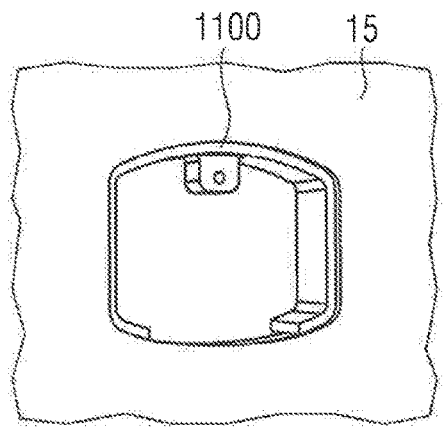

Then, as shown in FIG. 13b, a covering wall 15 can optionally be affixed to the wall 10 or the module 10. This covering wall 15 constitutes the visible wall of the washroom. The covering wall 15 also has a recess, so that the basic mount 1100 is accessible. The recess in the covering wall 15 can also be slightly larger than the circumference of the basic mount 1100. For example, the recess can be 1 mm larger than the outer circumference of the basic mount 1100. This is used to receive a seal as described in more detail in regard to FIGS. 14a-14c.

Figure 13C:
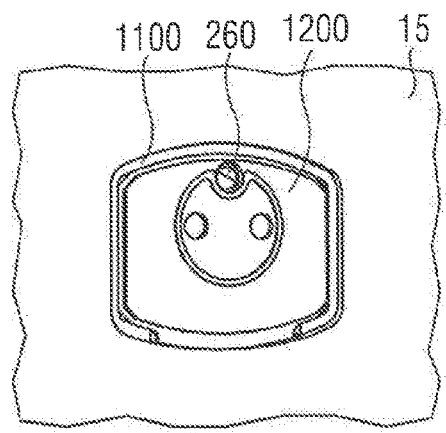
Figure 13D:
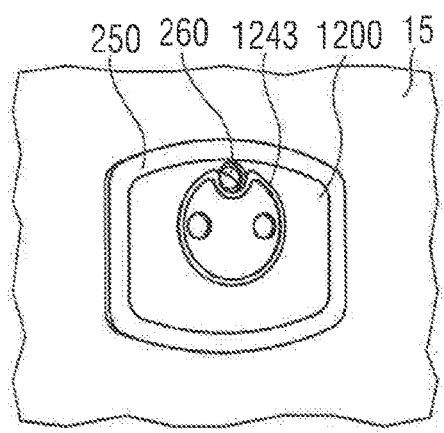
Figure 13E:
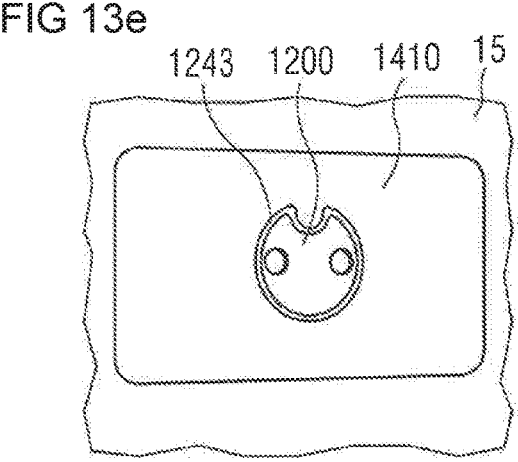
Figure 13F:
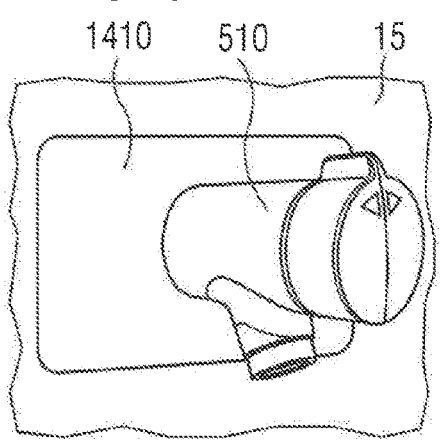

FIGS. 13c-13e represent, consecutively, the insertion of the adapter element 1200 into the basic mount 1100 and the common attachment with the fastener 260, the affixing of a seal 250 and the affixing of a covering panel 1410. The seal 250 can be formed so that it covers the section edge between the adapter element 1200 and the basic mount 1100 and, if possible, also brings about a seal with the covering wall 15. The covering panel 1410 has an opening, which has a shape corresponding to the projection 1243 of the adapter element 1200. A form-fit affixing of the covering panel 1410 to the adapter element 1200 is thereby created as already described in regard to the adapter element 200 and its projections 242.

Finally, the fitting 510 is attached to the fitting mount on a front side of the adapter element 1200. A fitting component can protrude from the adapter element for this, on which the fitting 510 is attached. Alternatively, the fitting 510 can also have a fitting component, which is received in the at least one opening 1231, 1232 of the adapter element 1200.

Figure 14A:
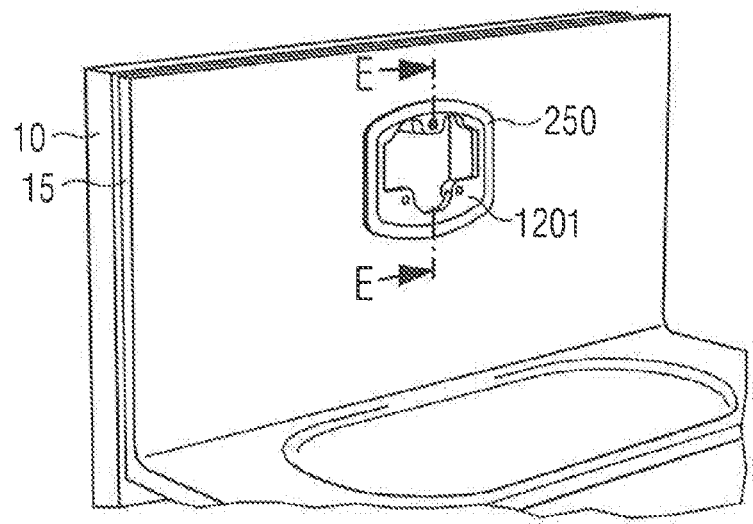
Figure 14B:
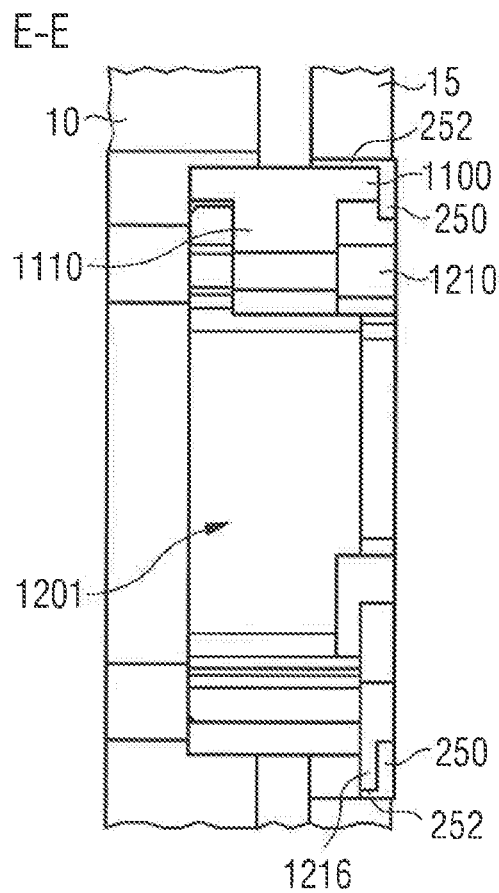
Figure 14C:
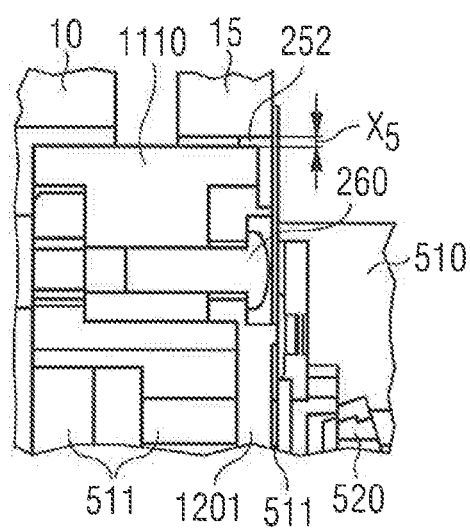

FIG. 14a shows a view in perspective of a section of a washroom with installed fitting mount, FIG. 14b shows a sectional view of the installed fitting mount and FIG. 14c shows a more detailed sectional view of the installed fitting mount. The washroom has a wall 10 or module 10 of the vehicle, arranged in front of which is a covering wall 15. Already connected to the wall 10 or module 10 is a basic mount 1100 and an adapter element 1201 (here of the type from FIG. 12d). The seal 250 has also already been affixed.

FIG. 14b shows a sectional view of the installed fitting mount along the section line E-E from FIG. 14a, which view shows the wall 10 or the module 10 partially as well as the covering wall 15 in its full thickness. The adapter element 1201 is dimensioned and arranged in the basic mount 1100 so that its coupling device 1210 abuts an end side of the second attachment device 1110 of the basic mount 1100. In this case, the adapter element 1201 is arranged flush with the front side of the covered wall 15. For this the flange 1101 of the basic mount 1100 can be arranged according to the wall thickness of the covering wall 15 and the gap between the covering wall 15 and the wall 10 or the module 10 in the depth direction of the basic mount 1100.

The seal 250 lies in a depression 1211 (see also depression 211 in FIG. 2a) of the adapter element 1201 and covers a section edge between adapter element 1201 and the basic mount 1100. The seal 250 can optionally have a continuation 252, which is inserted into the gap between the basic mount 1100 and the covering wall 15. The entire fitting mount can thereby be sealed relative to the covering wall 15 by a single seal. It is also shown in FIG. 14b that the continuation 252 of the seal 250 lies on an underside of the fitting mount between the projection 1216 of the adapter element 1201 and the covering wall 15. The continuation 252 of the seal 250 can have the same depth (in the depth direction of the fitting mount) along the entire circumference of the seal 250. Alternatively, the continuation 252 can have different depths, for example along the projection 1216 of the adapter element 1201 the continuation 252 can have a smaller depth. The seal 250 can protrude in this state a little between the adapter element 1201 and the covering wall 15.

In FIG. 14c the fastener 260 is shown in addition, which connects the adapter element 1201 frictionally to the basic mount 1100, as well as the covering panel 1410. A water pipe 511 is also shown, which protrudes as a fitting component on a front side of the adapter element 1201, in particular on a front side of the flat, disc-shaped component of the adapter element 1201. The fitting 510 is coupled frictionally thereto by the schematically illustrated fastener 515. By coupling the fitting 510 to the adapter element (here the water pipe 511) the covering panel 1410 can also be clamped and pressed firmly onto the adapter element 1201 and the covering wall 15, so that the covering panel 1410 rests flush on the adapter element 1201 and the covering wall 15. The seal 250 is compressed by this and the sealing effect improved.

Figure 15A:
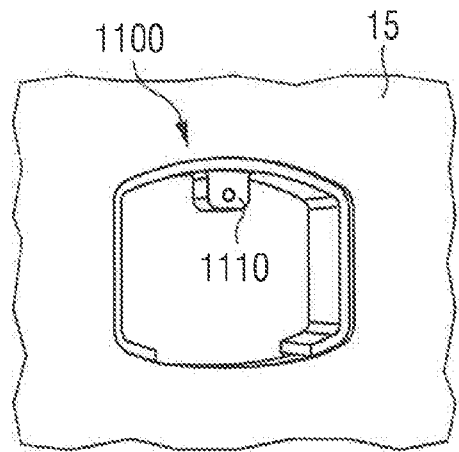

FIGS. 15*a*-15*e* show schematically the sequence of an installation of a fitting 540 by means of a fitting mount with a second embodiment of the adapter element 1600. The sequence of this installation is initially identical or very similar to the sequence as shown in FIGS. 13*a*-13*f*. In FIG. 15*a* the basic mount 1100 is therefore shown already in the state corresponding to FIG. 13*b*. In other words, the basic mount 1100 is attached to a wall 10 or a module 10 of a vehicle and was then provided with a covering wall 15 with corresponding recess. The recess in the covering wall 15 can also be slightly larger than the circumference of the basic mount 1100. For example, the recess can be 1 mm larger than the outer circumference of the basic mount 1100. This is used to receive the seal 250.

Figure 15B:
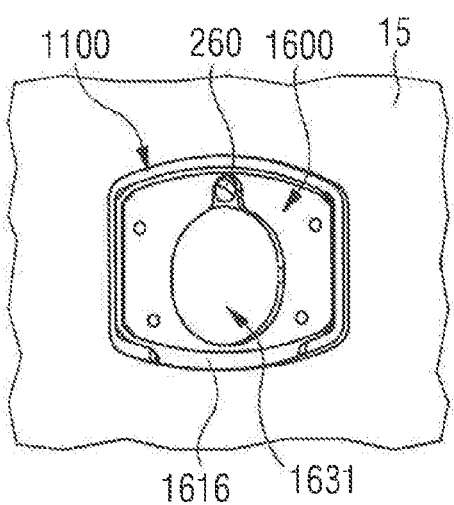
Figure 15C:
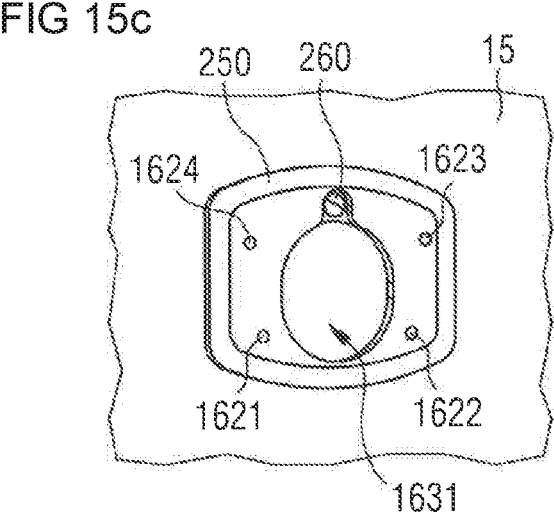

FIGS. 15*b* and 15*c* represent, consecutively, the insertion of the adapter element 1600 into the basic mount 1100 and the common attachment with the fastener 260 as well as the affixing of the seal 250. The adapter element 1600 further has four openings 1621-1624 (for example, holes), which are used to affix a covering panel 1450.

Figure 15D:
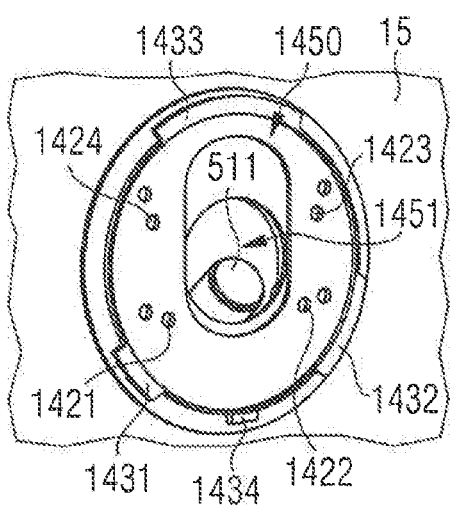

This is shown in FIG. 15*d*, wherein it is to be recognized that the covering panel 1450 has receptacles or openings 1421-1424 corresponding to the openings 1621-1624 of the adapter element 1600. The covering panel 1450 can thereby be frictionally attached by suitable fasteners (not shown) to the adapter element 1600. In this case the seal 250 is fixed over the section edge between the adapter element 1600 and the basic mount 1100 and if applicable pressed firmly in the space between the adapter element 1600, the basic mount 1100 and the covering wall 15, wherein a sealing effect is achieved relative to these three elements. A water pipe 511 and/or electric cable can further be reached or already protrude through an opening 1631 of the adapter element 1600 and a recess 1451 of the covering panel 1450 corresponding to this.

Figure 15E:
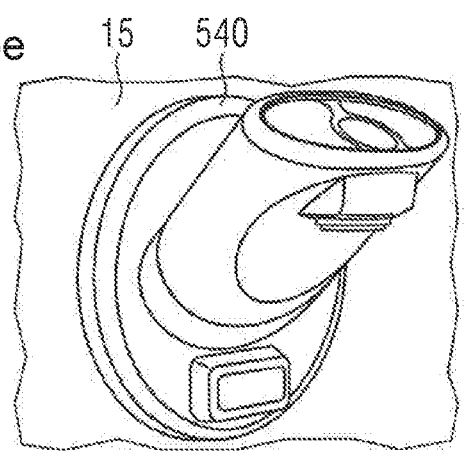

In contrast to the covering panel 1410, the covering panel 1450 also serves to attach the fitting 540. Snap aids 1431-1433, for example in the form of a bayonet fitting, are arranged for this circumferentially on the covering panel 1450. The fitting 540 has corresponding snap aids (not shown) or a corresponding bayonet fitting, with which the fitting 540 can be attached and positioned on the covering panel 1450 by a rotation. This state is shown in FIG. 15*e*. Optionally, a frictional coupling between the fitting 540 and the covering panel 1450 can be created by a fastener (not shown), for example on the underside of the fitting 540, through the fitting 540 into a corresponding attachment device 1434 of the covering panel 1450.

FIGS. 16*a*-16*e* again show, schematically, the sequence of an installation of the fitting 520 by means of a fitting mount with a third embodiment of the adapter element 1201. This sequence of the installation of the fitting 520 resembles the installation as described in regard to FIGS. 6*a*, 6*b* and 7 as well as the installation of the fitting 510 as described in regard to FIGS. 13*a*-13*f*. In the description of FIGS. 16*a*-16*e*, therefore, a description of identical working steps such as already explained in regard to FIGS. 6*a*, 6*b*, 7 and 13*a*-13*f* is omitted.

Figure 16A:
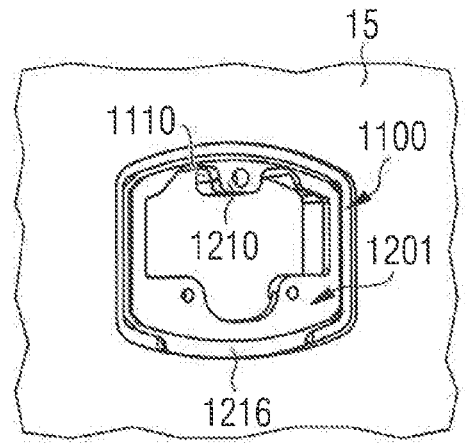

In FIG. 16*a*, corresponding to FIG. 13*c*, a fitting mount is shown in which the basic mount 1100 was attached to a wall 10 or a module 10 of a vehicle, a covering wall 15 is arranged and the adapter element 1201 is inserted into the basic mount 1100. Here the coupling device 1210 of the adapter element 1201 lies as flush as possible on an end side of the second attachment device 1110 of the basic mount 1100. The projection 1216 of the adapter element 1201 closes an opening or interruption in the internal guide surface 1120 of the basic mount 1100, as is also the case in the other embodiments of the adapter element 1200, 1300, 1600.

Figure 16B:
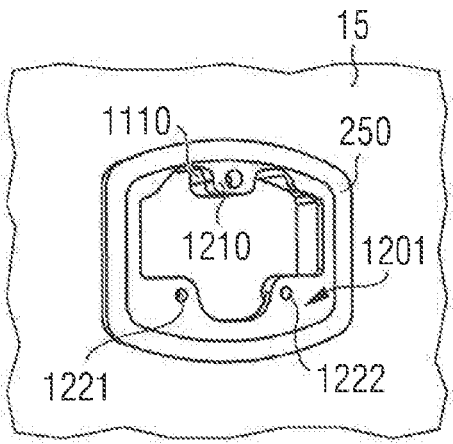
Figure 16C:
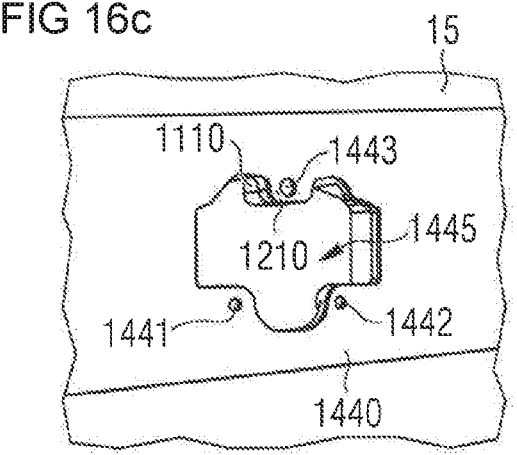
Figure 16D:
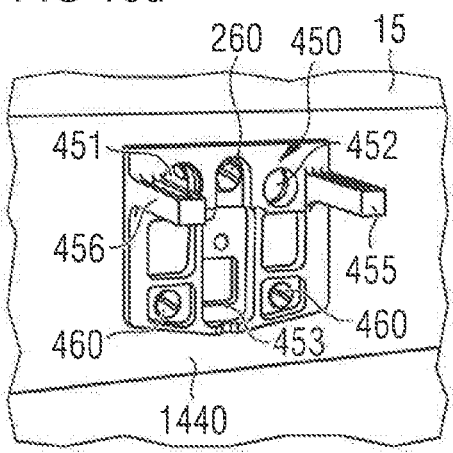
Figure 16E:
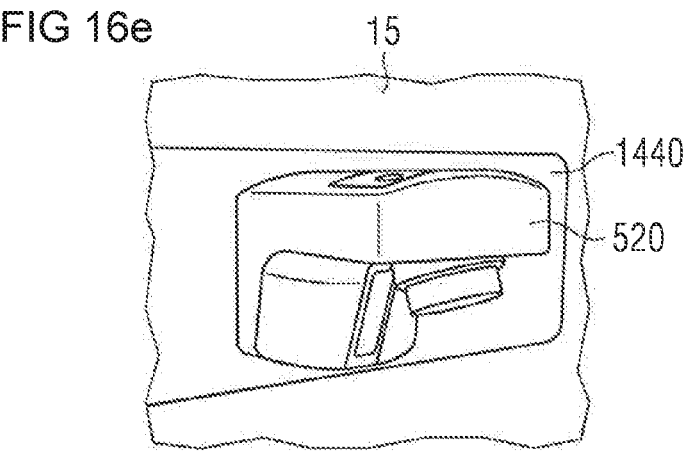

In FIG. 16*b* the seal 250 was inserted, while in FIG. 16*c* the covering panel 1440 is placed over the fitting mount. The covering panel 1440 largely corresponds to the covering panel 420 from FIGS. 6 and 7, with the exception that the covering panel 1440 has an opening 1445, which corresponds at least for the most part to the opening 1236 of the adapter element 1201.

According to the arrangement in FIG. 7, the fitting connection element 450 is then affixed to the covering panel 1440. Fasteners 260, 460 are led for this through corresponding openings in the fitting connection element 450 and through corresponding openings 1441-1443 of the covering panel 1440 and frictionally connected to the adapter element 1201. In the case of the fastener 260, a frictional fit is also created with the basic mount 1100.

The fitting 520 is then attached to the fitting connection element 450 (see FIG. 16*e*), for example by a frictional connection with the at least one projection 455, 456. The affixing of the fitting 520 on the fitting connection element 450 likewise corresponds to the affixing as explained in regard to FIG. 7.

FIGS. 17*a*-17*d* show schematically the sequence of an installation of a fitting 530 by means of a fitting mount of a fourth embodiment of the adapter element 1300. The sequence of the installation of the fitting 530 is very similar and partially identical to the installation as described in regard to FIGS. 9*a*, 9*b* and FIGS. 10*a*, 10*b*. In the description of FIGS. 17*a*-17*d* a description of identical working steps as already explained in regard to FIGS. 9*a*, 9*b* and FIGS. 10*a*, 10*b* has therefore been omitted.

Figure 17A:
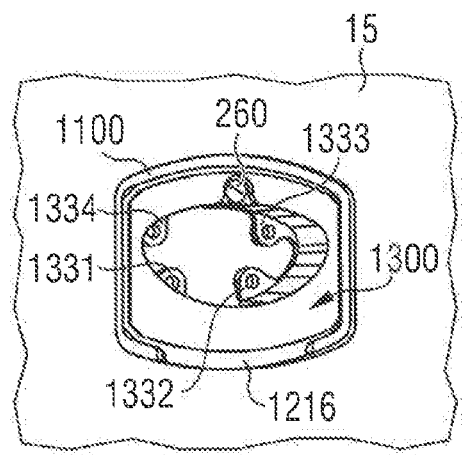
Figure 17B:
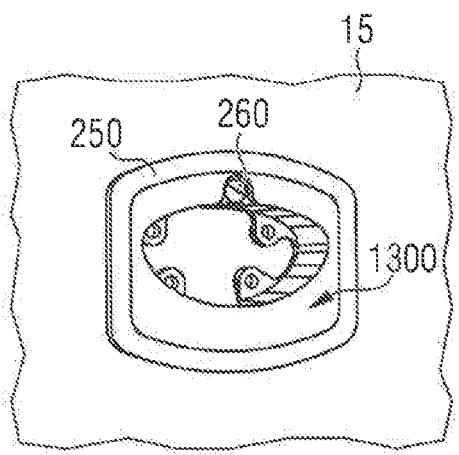

FIGS. 17*a* and 17*b* show, corresponding to FIGS. 13*c* and 13*d*, a fitting mount in which the basic mount 1100 was attached to a wall 10 or module 10 of a vehicle, a covering wall 15 is arranged, the adapter element 1300 is inserted into the basic mount 1100 and was frictionally coupled by means of fastener 260 and the seal 250 was affixed.

Figure 17C:
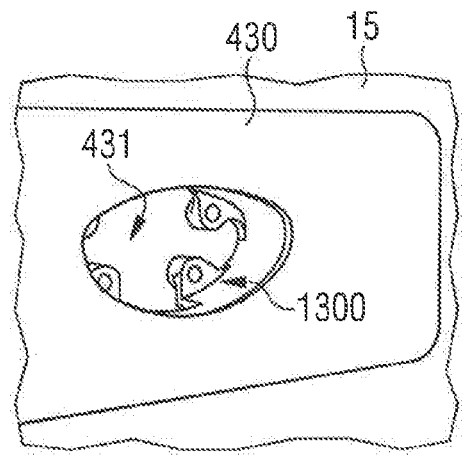
Figure 17D:
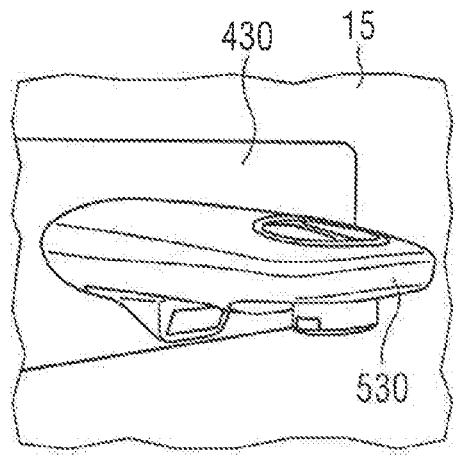

FIGS. 17*c* and 17*d* correspond to the two illustrations in FIGS. 9*a* and 9*b*, i.e., the affixing of the covering panel 430 and the mounting of the fitting 530, which take place in the same manner as explained in regard to FIGS. 9*a* and 9*b*.

It is understood that the exemplary embodiments explained previously by way of example are not conclusive and do not restrict the object disclosed here. In particular, it is evident to the person skilled in the art that he can combine the features described with one another in any way and/or can omit various features without deviating from the object disclosed here.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fitting mount for a vehicle washroom, comprising:
an adapter element with
   a coupling device,
   at least one opening, which is configured to receive a fitting component, and
   a circumferential guide surface;
a basic mount with
   a first attachment device for attachment of the basic mount,
   a second attachment device, which is configured to be coupled to the coupling device of the adapter element and to be attached detachably to this, and
   an internal guide surface, which is configured to at least partially enclose the circumferential guide surface of the adapter element; and
a covering panel, which is configured to be affixed between the adapter element and a fitting.

2. The fitting mount according to claim 1, wherein the at least one opening of the adapter element is further configured to receive the fitting component in a form-fit manner.

3. The fitting mount according to claim 1, wherein the fitting component is attached via a fastener to the adapter element.

4. The fitting mount according to claim 1, wherein the fitting component is at least one of a water pipe or electric cable, which is led at least partially through the at least one opening of the adapter element.

5. The fitting mount according to claim 4, wherein the fitting is a water-dispensing fitting and can be attached to the water pipe or electric cable, wherein the adapter element further has a support surface for the direct or indirect coupling of the fitting to the adapter element.

6. The fitting mount according to claim 1, wherein the second attachment device of the basic mount and the coupling device of the adapter element have at least one of corresponding guide surfaces or openings for receiving a fastener.

7. The fitting mount according to claim 1, wherein the adapter element has at least one projection and the covering panel has at least one corresponding receptacle, into which a projection respectively protrudes when the covering panel is affixed on the adapter element.

8. The fitting mount according to claim 1, wherein the covering panel has at least one opening, which is configured to receive a fitting component, wherein the at least one opening corresponds respectively to one of the at least one opening of the adapter element when the covering panel is affixed on the adapter element.

9. The fitting mount according to claim 1, further comprising:
a fitting connection element, which is configured to be introduced at least partially into the fitting and to be attached to the fitting,
wherein the fitting connection element is further configured to be attached to the adapter element.

10. The fitting mount according to claim 1, further comprising:
a fitting connection element, which is configured to be introduced at least partially into the fitting and to be attached to the fitting,
wherein the fitting connection element is further configured to be attached to the covering panel.

11. The fitting mount according to claim 1, further comprising:
a fitting connection element, which is configured to be introduced at least partially into the fitting and to be attached to the fitting,
wherein the fitting connection element is formed in one piece with the covering panel.

12. The fitting mount according to claim 1, further comprising a seal, which is arranged between the adapter element and the covering panel.

13. The fitting mount according to claim 12, wherein the seal has a thickening, which is configured to be laid in a form-fit manner into a corresponding depression of the adapter element.

14. The fitting mount according to claim 12, wherein the seal has a continuation, which is configured to at least partially encompass the basic mount.

15. The fitting mount according to claim 12, wherein the seal has a continuation, which is configured to at least partially encompass the adapter element.

16. A vehicle washroom, comprising a fitting mount according to claim 1.

17. A vehicle with a fitting mount according to claim 1.

18. A fitting mount for a vehicle washroom, comprising:
an adapter element with
   a coupling device,
   at least one opening, which is configured to receive a fitting component, and
   a circumferential guide surface; and
a basic mount with
   a first attachment device for attachment of the basic mount,
   a second attachment device, which is configured to be coupled to the coupling device of the adapter element and to be attached detachably to this, and
   an internal guide surface, which is configured to at least partially enclose the circumferential guide surface of the adapter element,
wherein the circumferential guide surface of the adapter element extends outwardly at an angle to a disc-shaped portion of the adapter element and the internal guide surface of the basic mount is formed by an outwardly extending flange on a disc-shaped portion of the basic mount.

* * * * *